US007519467B2

United States Patent
Katoh

(10) Patent No.: US 7,519,467 B2
(45) Date of Patent: Apr. 14, 2009

(54) CYLINDER AIR-FUEL RATIO CONTROLLER FOR INTERNAL COMBUSTION ENGINE

(75) Inventor: Tatsunori Katoh, Aichi-gun (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 7 days.

(21) Appl. No.: 11/819,652

(22) Filed: Jun. 28, 2007

(65) Prior Publication Data

US 2008/0040018 A1  Feb. 14, 2008

(30) Foreign Application Priority Data

Aug. 8, 2006 (JP) ............... 2006-215165
Aug. 8, 2006 (JP) ............... 2006-215166

(51) Int. Cl.
*B60T 7/12* (2006.01)
*F02D 41/00* (2006.01)

(52) U.S. Cl. .............. 701/103; 701/114; 123/673; 73/114.52; 73/114.72

(58) Field of Classification Search ......... 701/101, 701/103, 104, 109, 114, 115; 123/434, 435, 123/673, 690, 681, 684; 73/114.52, 114.53, 73/114.71, 114.72
See application file for complete search history.

(56) References Cited

U.S. PATENT DOCUMENTS 5,131,372 A   7/1992  Nakaniwa
7,051,725 B2  5/2006  Ikemoto et al.
7,273,046 B2 * 9/2007  Osumi ................. 123/681
2003/0183206 A1 * 10/2003 Fujimoto et al. ........ 123/520
2006/0005821 A1 * 1/2006  Osumi et al. ........... 123/674
2008/0004787 A1 * 1/2008  Mitsuda et al. ......... 701/101
2008/0092858 A1 * 4/2008  Satoh et al. ........... 123/520
2008/0243362 A1 * 10/2008 Mitsuda et al. ......... 701/103
2008/0275623 A1 * 11/2008 Osumi et al. ........... 701/103

FOREIGN PATENT DOCUMENTS

JP  56-020727  2/1981
JP  01-237336  9/1989

* cited by examiner

*Primary Examiner*—John T Kwon
(74) *Attorney, Agent, or Firm*—Nixon & Vanderhye PC

(57) ABSTRACT

An air-fuel ratio of each cylinder is estimated on the basis of the detection value of an air-fuel ratio sensor disposed in an exhaust confluent portion. An air-fuel ratio correction quantity is computed on the basis of the estimated air-fuel ratio of each cylinder and the air-fuel ratio correction quantity is learned by smoothing processing. The air-fuel ratio is corrected on the basis of the cylinder air-fuel ratio correction quantity, whereby the air-fuel ratio is controlled for each cylinder so as to reduce a variation in the air-fuel ratio between the cylinders. When a state in which the correction quantity of any cylinder is outside a specified range continues for a while during a period in which the air-fuel ratio is controlled for each cylinder, the correction quantity is prohibited from being learned, whereby the cylinder air-fuel ratio correction quantity is prevented from being erroneously learned.

7 Claims, 21 Drawing Sheets

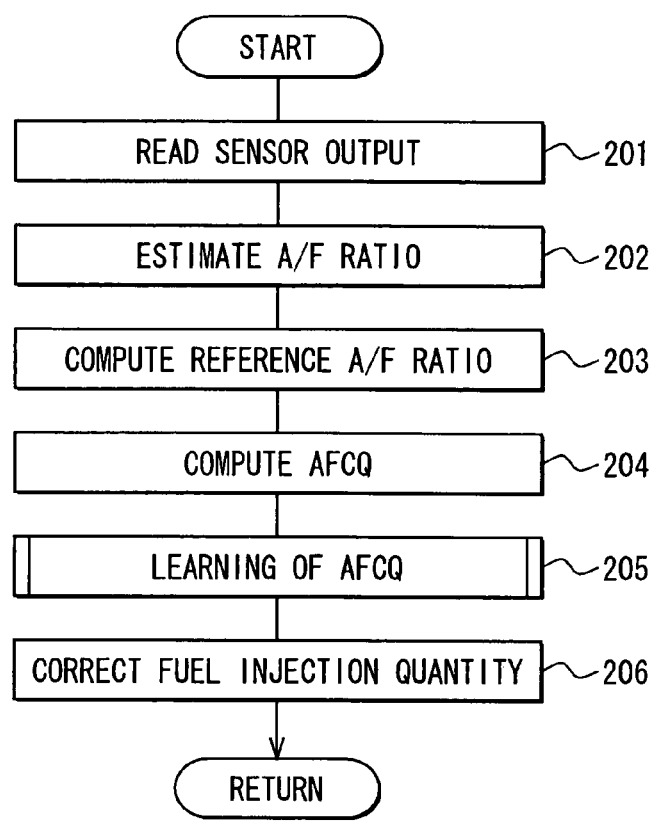
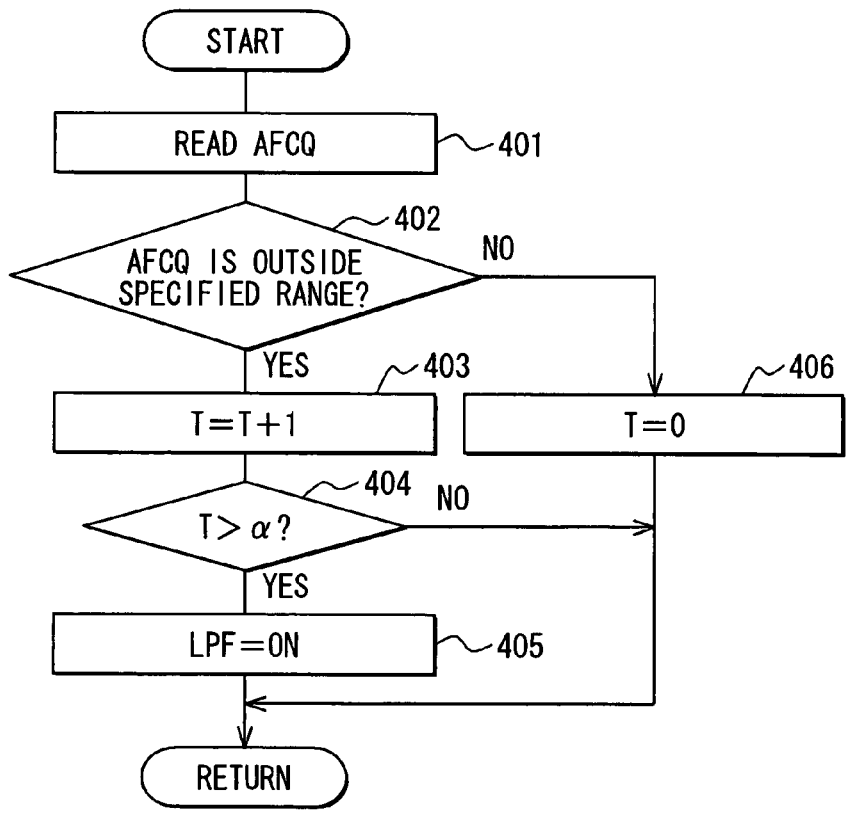

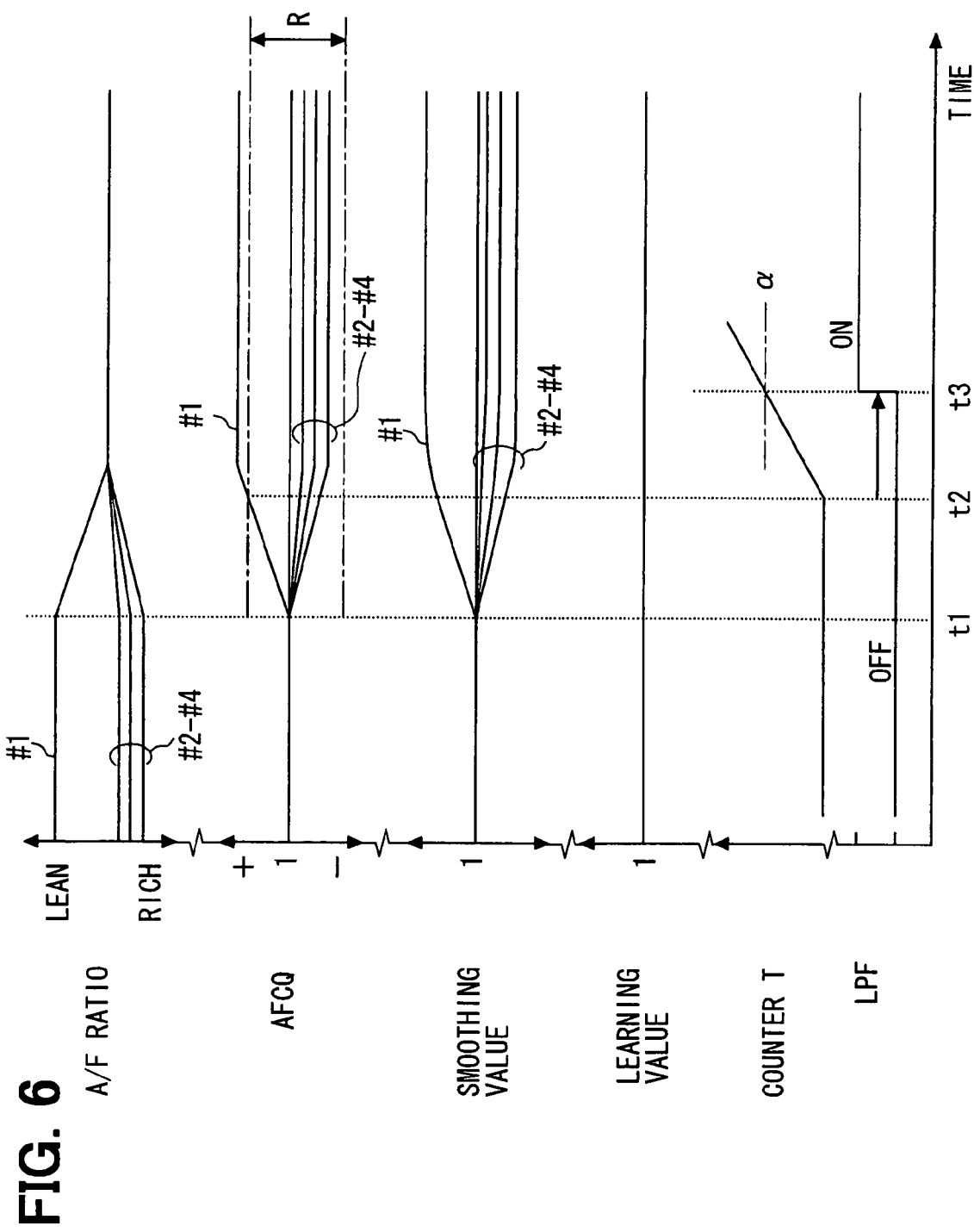

CYLINDER AIR-FUEL RATIO CONTROLLER FOR INTERNAL COMBUSTION ENGINE

CROSS-REFERENCE TO RELATED APPLICATION

This application is based on Japanese Patent Applications No. 2006-215165 filed on Aug. 8, 2006, and No. 2006-215166 filed on Aug. 8, 2006, the disclosure of which are incorporated herein by reference.

FIELD OF THE INVENTION

The present invention relates to a cylinder air-fuel ratio controller for an internal combustion engine having a function for estimating an air-fuel ratio of each cylinder (cylinder air-fuel ratio) on the basis of the detection value of an air-fuel ratio sensor disposed in an exhaust gas confluent portion into which exhaust gas from a plurality of cylinders flows.

BACKGROUND OF THE INVENTION

JP-A-2005-207405 (U.S. Pat. No. 7,051,725 B2) shows a cylinder air-fuel ratio control system including the controller. In this system, air-fuel ratios of a plurality of cylinders are estimated for the respective cylinders on the basis of the output of one air-fuel ratio sensor disposed in an exhaust confluent portion where exhaust gas from the plurality of cylinders joins, air-fuel ratio correction quantities of the respective cylinders (cylinder air-fuel ratio correction quantities) for correcting variations in an air-fuel ratio between the cylinders are computed for the respective cylinders, the cylinder air-fuel ratio correction quantities are learned by smoothing processing or the like, and cylinder air-fuel ratio control for controlling the air-fuel ratios (fuel injection quantities) of the plurality of cylinders for the respective cylinders is performed on the basis of the cylinder air-fuel ratio correction quantities and their learning values. Further, in this cylinder air-fuel ratio control system, on operating condition that the estimation of the cylinder air-fuel ratio is difficult (the computation of the cylinder air-fuel ratio is difficult), the cylinder air-fuel ratio control is performed by the use of the learning values of the cylinder air-fuel ratio correction quantities.

In this cylinder air-fuel ratio control system, for example, when the estimation accuracy of the cylinder air-fuel ratio is decreased by a deviation in sampling timing of the output of the air-fuel sensor or a variation in the fuel injection quantity is increased by individual difference of the fuel injection system of each cylinder (variation in manufacture or deterioration with time of a fuel injection valve), variations in the air-fuel ratio between the cylinders may be increased to increase the cylinder air-fuel ratio correction quantity and its learning value. However, it can be thought that as the cylinder air-fuel ratio correction quantity and its learning value are increased, the accuracies thereof are degraded. Hence, when the learning value of the cylinder air-fuel ratio correction quantity is updated without limitation, there is a possibility that the cylinder air-fuel ratio correction quantity is erroneously learned to perform the cylinder air-fuel ratio control in an erroneous direction. This contrarily raises the possibility of impairing the accuracy of the cylinder air-fuel ratio control.

Moreover, this engine control system is mounted with a self-diagnosis function of performing various abnormality diagnoses such as deterioration diagnosis of a catalyst, abnormality diagnosis of a fuel system, abnormality diagnosis of an air-fuel ratio sensor, diagnosis of state of combustion (detection of misfire), and diagnosis of fuel property.

These abnormality diagnoses are performed by the use of the output of the air-fuel ratio sensor and parameters affected and changed by the air-fuel ratio (for example, engine revolution speed). Hence, when the state of control of the cylinder air-fuel ratio control is not stabilized, there is a possibility that the abnormality diagnoses will be erroneously performed because of the effect of the unstable state of control.

SUMMARY OF THE INVENTION

An object of the present invention is to provide a cylinder air-fuel ratio controller of an internal combustion engine that can prevent the accuracy of cylinder air-fuel ratio control from being degraded by the erroneous learning of a cylinder air-fuel ratio correction quantity.

Further, another object of the present invention is to provide a cylinder air-fuel ratio controller of an internal combustion engine that can prevent erroneous diagnosis of abnormality diagnosis affected by cylinder air-fuel ratio control in a system for performing cylinder air-fuel ratio control on the basis of the detection value of an air-fuel ratio sensor.

To achieve the foregoing objects, a cylinder air-fuel ratio controller includes cylinder air-fuel ratio estimation means that has an air-fuel ratio sensor disposed in an exhaust gas confluent portion where exhaust gas from a plurality of cylinders of the internal combustion engine confluents. The air-fuel ratio sensor detects an air-fuel ratio of the exhaust gas. The estimation means estimates an air-fuel ratio of each cylinder on the basis of a detection value of the air-fuel ratio sensor. The controller further includes cylinder air-fuel ratio correction quantity computation means for computing an air-fuel ratio correction quantity of each cylinder ("cylinder air-fuel ratio correction quantity") for correcting a variation in the air-fuel ratio between the plurality of cylinders for each cylinder. The controller further includes cylinder learning means for learning the cylinder air-fuel ratio correction quantity, and cylinder air-fuel ratio control means for performing cylinder air-fuel ratio control for correcting a fuel injection quantity of each cylinder on the basis of the cylinder air-fuel ratio correction quantity and/or its learning value to reduce the variation in the air-fuel ratio between the cylinders. When the cylinder air-fuel ratio correction quantity of any one cylinder or two or more cylinders is outside a specified range, the learning of the cylinder air-fuel ratio correction quantity by the cylinder learning means is prohibited by learning prohibition means. With this, it is possible to prohibit the learning of the cylinder air-fuel ratio correction quantity when the cylinder air-fuel ratio correction quantity of any one cylinder or two or more cylinders is outside the specified range (allowable range). Thus, it is possible to prevent the erroneous learning of the cylinder air-fuel ratio correction quantity and hence to prevent the accuracy of the cylinder air-fuel ratio control from being impaired.

Moreover, a cylinder air-fuel ratio controller of the present invention includes cylinder air-fuel ratio estimation means that has an air-fuel ratio sensor disposed in an exhaust gas confluent portion where exhaust gas from a plurality of cylinders of the internal combustion engine confluents, and estimates an air-fuel ratio of each cylinder on the basis of a detection value of the air-fuel ratio sensor. The controller further includes cylinder air-fuel ratio correction quantity computation means for computing an air-fuel ratio correction quantity of each cylinder ("cylinder air-fuel ratio correction quantity") for correcting a variation in the air-fuel ratio between the plurality of cylinders for each cylinder, and cylinder air-fuel ratio control means for performing cylinder air-fuel ratio control for correcting a fuel injection quantity of each cylinder on the basis of the cylinder air-fuel ratio correction quantity and/or its learning value to reduce the variation in the air-fuel ratio between the cylinders. The controller further includes abnormality diagnosis means for performing abnormality diagnosis on the basis of an output of the air-fuel sensor and/or an output of other exhaust gas sensor, or a parameter affected by an air-fuel ratio, and diagnosis prohibition means for prohibiting at least one of the abnormality diagnosis performed by the abnormality diagnosis means or for canceling its diagnosis result when the cylinder air-fuel ratio correction quantity of any one cylinder or any two or more cylinders or its learning value is outside a specified range.

With this, when the cylinder air-fuel ratio correction quantity or its learning value of any one cylinder or two or more cylinders is outside the specified range (allowable range), it is possible to determine that the state of control of cylinder air-fuel ratio control is unstable and to prohibit abnormality diagnosis or to cancel its diagnosis result. Thus, it is possible to prevent the erroneous diagnosis of the abnormality diagnosis affected by the cylinder air-fuel ratio control and hence to improve the reliability of the abnormality diagnosis.

BRIEF DESCRIPTION OF THE DRAWINGS

FIG. 3 is a flow chart showing the flow of processing of a routine for performing cylinder air-fuel ratio control in the first embodiment.

FIG. 5 is a flow chart showing the flow of processing of a routine for determining prohibition of learning in the first embodiment.

FIG. 6 is a time chart showing a control example in the first embodiment.

DETAILED DESCRIPTION OF EMBODIMENTS

The several embodiments embodying the best mode for carrying out the present invention will be described below.

First Embodiment

A first embodiment of the present invention will be described with reference to FIG. 1 to FIG. 7.

Figure 1:
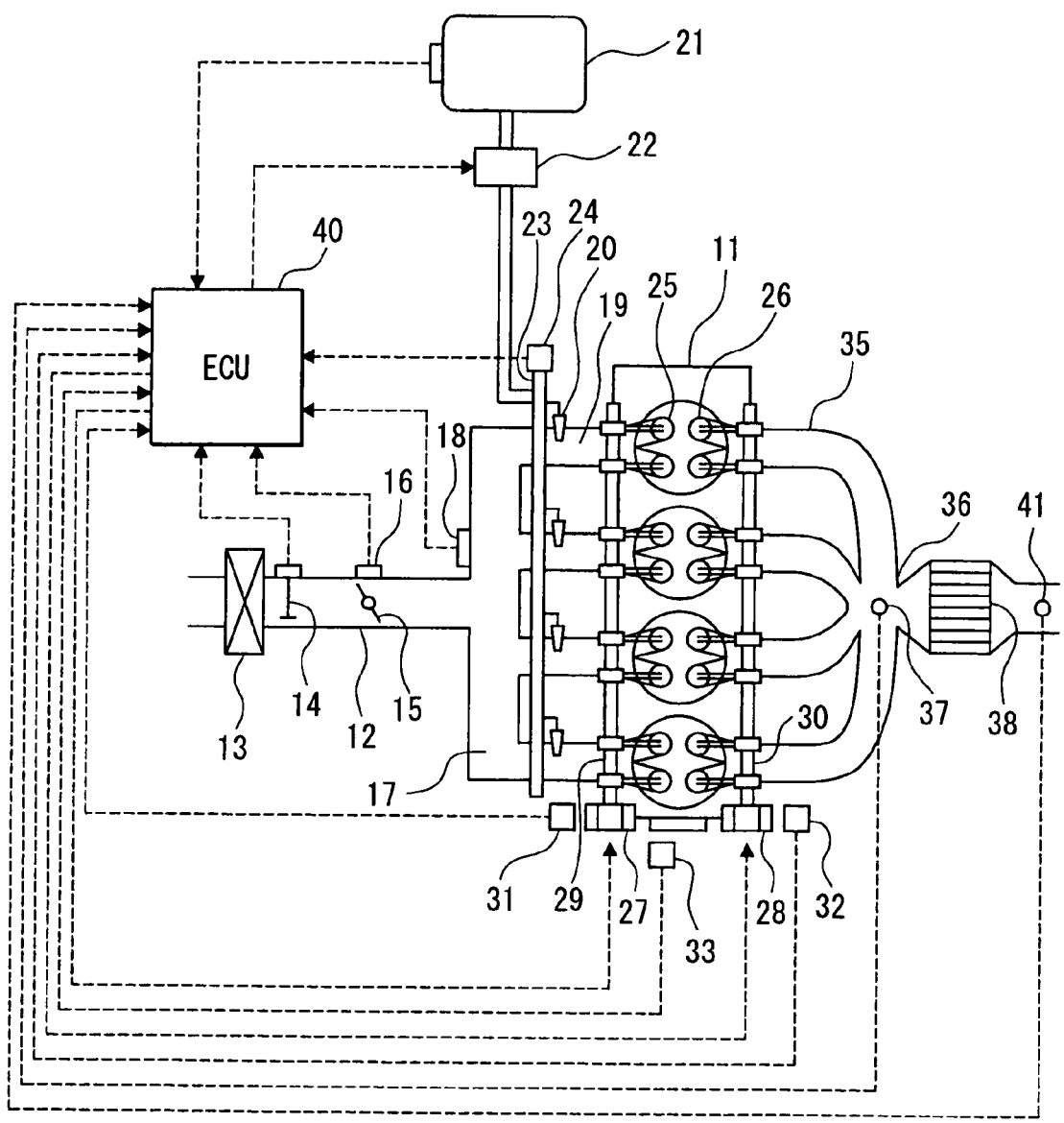
FIG. 1 is a schematic view showing an entire engine control system according to a first embodiment of the present invention.

A general construction of an entire engine control system is described with reference to FIG. 1. An air cleaner 13 is disposed upstream of an intake pipe 12 of, for example, an in-line four-cylinder engine 11, which is an internal combustion engine. An air flow meter 14 for detecting an intake air quantity is disposed downstream of the air cleaner 13. A throttle valve 15 having its opening controlled by a motor or the like and a throttle position sensor 16 for detecting a throttle opening are disposed downstream of the air flow meter 14.

A surge tank 17 is disposed downstream of the throttle valve 15. The surge tank 17 is provided with an intake pipe pressure sensor 18 for detecting an intake pipe pressure. Moreover, the surge tank 17 is provided with intake manifolds 19 for introducing air into the respective cylinders of the engine 11. Fuel injectors 20 for injecting fuel are respectively secured near the intake ports of the intake manifolds 19 of the respective cylinders. While the engine 11 is operated, fuel in a fuel tank 21 is sent to a delivery pipe 23 by a fuel pump 22 and is injected from the fuel injectors 20 of the respective cylinders at injection timings of the respective cylinders. The delivery pipe 23 is provided with a fuel pressure sensor 24 for detecting the pressure of the fuel (fuel pressure).

The engine 11 is provided with variable valve timing mechanisms 27, 28 for varying the opening and closing timings of intake valves 25 and exhaust valves 26. Further, the engine 11 is provided with an intake cam angle sensor 31 and an exhaust cam angle sensor 31, which output cam angle signals in synchronization with the rotations of the intake camshaft 29 and an exhaust camshaft 30, respectively. Still further, the engine 11 is provided with a crank angle sensor 33 for outputting a crank angle signal pulse at intervals of a predetermined crank angle (for example, 30° CA) in synchronization with the rotation of the crankshaft of the engine 11.

On the other hand, an air-fuel ratio sensor 37 for detecting the air-fuel ratio of exhaust gas is disposed in an exhaust gas confluent portion 36 where the exhaust manifolds 35 of the respective cylinders of the engine 11 join. A catalyst 38 such as a three-way catalyst for cleaning CO, HC, and NOx in the exhaust gas is disposed downstream of the air-fuel ratio sensor 37. Further, an oxygen sensor 41 (exhaust gas sensor) for detecting the exhaust gas passing through the catalyst 38 being rich or lean is disposed downstream of the catalyst 38. The output of the oxygen sensor 41 is used for the sub-feedback control of correcting a target air-fuel ratio upstream of the catalyst 38 or for the deterioration diagnosis of the catalyst 38.

In addition, the engine 11 is mounted with an exhaust gas recirculation unit for recirculating a portion of exhaust gas into an intake system, a positive crankcase ventilation unit for recirculating blow-by gas leaking into the crankcase into the intake system, and an evaporated gas purge unit for adsorbing evaporated gas (fuel evaporation gas) produced in the fuel tank 21 by the canister and for purging the evaporated gas into the intake system.

The outputs of various sensors such as the air-fuel ratio sensor 37 are inputted to an engine control circuit (hereinafter denoted as "ECU") 40. The ECU 40 is mainly composed of a microcomputer and executes various engine control programs stored in a built-in ROM (storage medium) to control the fuel injection quantities and ignition timings of the fuel injectors 20 of the respective cylinders according to the operating state of the engine 11.

In the first embodiment, the ECU 40 executes the respective routines for cylinder air-fuel ratio control shown in FIG. 2 and FIG. 5 to estimate the air-fuel ratio of each cylinder on the basis of the detection value of the air-fuel ratio sensor 37 (actual air-fuel ratio of exhaust gas flowing in the exhaust confluent portion 36) by the use of a cylinder air-fuel ratio estimation model to be described later while the engine is operated. The ECU 40 computes the average value of the estimated air-fuel ratios of all cylinders and sets the average value to a reference air-fuel ratio (target air-fuel ratio of all cylinders). The ECU 40 computes the deviation between the estimated air-fuel ratio of each cylinder (estimated cylinder air-fuel ratio) and the reference air-fuel ratio and computes a fuel correction factor for the fuel injection quantity of each cylinder (cylinder air-fuel ratio correction quantity) so as to decrease the deviation. The ECU 40 learns the cylinder air-fuel ratio correction quantity by smoothing processing or the like and corrects the fuel injection quantity of each cylinder on the basis of the cylinder air-fuel ratio correction quantity and its learning value, thereby correcting the air-fuel ratio of a air-fuel mixture, which is to be supplied to each cylinder, for each cylinder to control the air-fuel ratio of each cylinder so as to reduce variations in the air-fuel ratio between the cylinders (this control is hereinafter referred to as "cylinder air-fuel ratio control"). At this time, the cylinder air-fuel ratio correction quantity is learned by smoothing processing or the like and the learning value is updated and stored in a rewritable non-volatile memory (not shown) such as backup RAM of the ECU 40. Under operating conditions in which the estimation of the cylinder air-fuel ratio is difficult (the computation of the cylinder air-fuel ratio correction quantity is difficult), the cylinder air-fuel ratio control may be performed by the use of the learning value of the cylinder air-fuel ratio correction quantity.

A model for estimating the air-fuel ratio of each cylinder (hereinafter referred to as "cylinder air-fuel ratio estimation model") on the basis of the detection value of the air-fuel ratio sensor 37 (actual air-fuel ratio of the exhaust gas flowing in the exhaust confluent portion 36) will be described.

With attention focused on gas exchange in the exhaust confluent portion 36, the detection value of the air-fuel ratio sensor 37 is formed into a model of the summation of the product of the history of the estimated air-fuel ratio of each cylinder in the exhaust confluent portion 36 and a predetermined weighting coefficient and the product of the history of the detected value of the air-fuel sensor 37 and a predetermined weighting coefficient. Then, the air-fuel ratio of each cylinder is estimated by the use of this model. At this time, a Kalman filter is used as an observer.

More specifically, the model of the gas exchange in the exhaust confluent portion 36 is approximated by the following equation (1), $$ys(t) = k1 \times u(t-1) + k2 \times u(t-2) - k3 \times ys(t-1) - k4 \times ys(t-2) \quad (1)$$

where "ys" is the detection value of the air-fuel sensor 37, "u" is the air-fuel ratio of exhaust gas flowing into the exhaust confluent portion 36, and "k1" to "k4" are constants.

In the exhaust system, there exist a first-order lag element of the inflow and mixing of gas in the exhaust confluent portion 36 and a first-order lag due to a delay in response of the air-fuel ratio sensor 37. Thus, in the above equation (1), the last two histories are referred to in consideration of these first-delay elements.

When the above equation (1) is converted into a state-space model, the following equations (2a), (2b) are derived, $$X(t+1) = A \times X(t) + B \times u(t) + W(t) \quad (2a)$$

$$Y(t) = C \times X(t) + D \times u(t) \quad (2b)$$

where A, B, C, and D are parameters of the model, Y is the detection value of the air-fuel sensor 37, X is the estimated air-fuel ratio of each cylinder, which is a state variable, and W is noise.

Further, when a Kalman filter is designed from the above equations (2a), (2b), the following equation (3) can be obtained, $$X\hat{}(k+1|k) = A \times X\hat{}(k|k-1) + K\{Y(k) - C \times A \times X\hat{}(k|k-1)\} \quad (3)$$

where $X\hat{}$ (X hat) is the estimated air-fuel ratio of each cylinder and K is a Kalman gain. $X\hat{}(k+1|k)$ represents that the estimated value of the next time (k+1) is found from the estimated value of time (k).

In this manner, by constructing the cylinder air-fuel ratio estimation model by an observer of a Kalman filter type, the air-fuel ratio of each cylinder can be estimated in sequence as the combustion cycle proceeds.

In this first embodiment, the cylinder air-fuel ratio correction quantity computed on the basis of the deviation between the estimated air-fuel ratio of each cylinder and the reference air-fuel ratio is learned by smoothing processing or the like and the learning value is updated and stored for each cylinder in the rewritable non-volatile memory (not shown) such as backup RAM of the ECU 40. As the cylinder air-fuel ratio correction quantity may become larger, the learning accuracy becomes worse. Hence, when the learning value of the cylinder air-fuel ratio correction quantity is updated without limitation, there is a possibility that the cylinder air-fuel ratio correction quantity will be learned erroneously to perform the cylinder air-fuel ratio control in a erroneous direction, which conversely degrading the accuracy of the cylinder air-fuel ratio control.

In this first embodiment, when a state in which the cylinder air-fuel ratio correction quantity of any cylinder is outside a specified range (allowable range) continues for a while, the learning of the cylinder air-fuel ratio correction quantity is prohibited to prevent the erroneous learning of the cylinder air-fuel ratio correction quantity.

The foregoing learning of the cylinder air-fuel ratio control and the cylinder air-fuel ratio correction quantity is performed by the ECU 40 according to the respective routines shown in FIG. 2 to FIG. 5. The process of the respective routines will be described below.

[Main Routine for Cylinder Air-Fuel Ratio Control]

Figure 2:
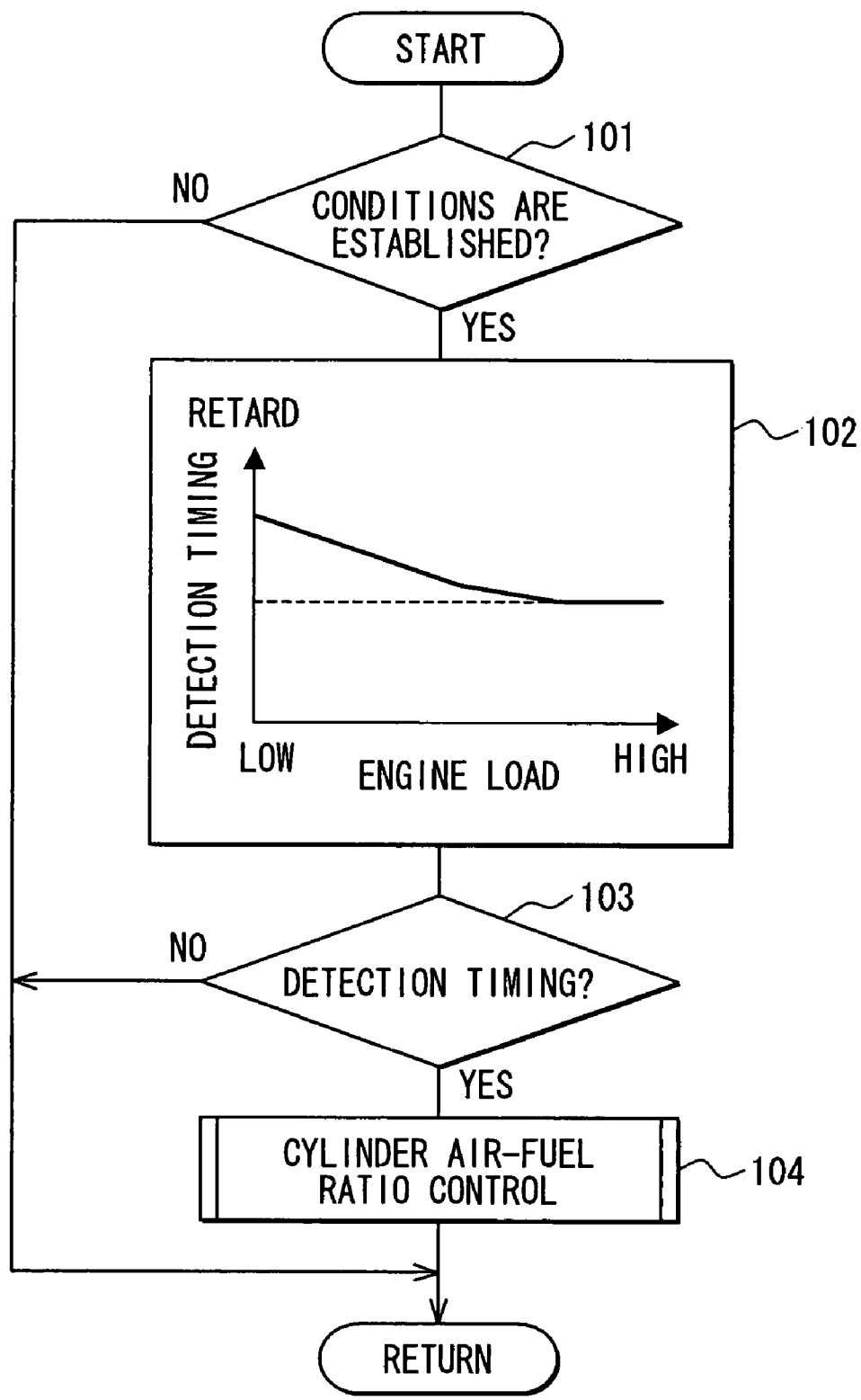
FIG. 2 is a flow chart showing the flow of processing of a main routine for cylinder air-fuel ratio control in the first embodiment.

A main routine for cylinder air-fuel ratio control shown in FIG. 2 is started at intervals of a specified crank angle (for example 30° CA) in synchronization with the output pulse of the crank angle sensor 33. In step S101, it is determined whether conditions for performing the cylinder air-fuel ratio control are satisfied. The conditions for performing the cylinder air-fuel ratio control include, for example, the following conditions (1) to (4).

(1) The air-fuel ratio sensor 37 is active.
(2) The air-fuel ratio sensor 37 is not determined to be abnormal (faulty)
(3) The engine 11 is warmed up (for example, cooling water temperature is a specified temperature or more).
(4) An engine operating range (for example, engine revolution speed and intake pipe pressure) is an operating range capable of securing the accuracy of estimation of an air-fuel ratio.

When all these four conditions (1) to (4) are satisfied, the conditions for performing the cylinder air-fuel ratio control hold. When any one of the conditions is not satisfied, the conditions for performing the cylinder air-fuel ratio control do not hold. When the conditions for performing the cylinder air-fuel ratio control do not hold, this routine is finished without performing the next and subsequent processings.

On the other hand, when the conditions for performing the cylinder air-fuel ratio control hold, the routine proceeds to step S102 where air-fuel ratio detection timing (sampling timing of the output of the air-fuel ratio sensor 37) of each cylinder is set by the use of a map according to an engine load (for example, intake pipe pressure) at that time. Here, the air-fuel ratio detection timing of each cylinder may be set by the use of a map according to the engine load and the engine revolution speed.

Then, the routine proceeds to step 103 where a present crank angle is the air-fuel ratio detection timing set in the step 102. When the present crank angle is not the air-fuel ratio detection timing set in the step 102, this routine is finished without performing the next and subsequent processings.

On the contrary, when the present crank angle is the air-fuel ratio detection timing set in the step 102, the routine proceeds to step 104 where a routine for performing cylinder air-fuel ratio control shown in FIG. 3 is performed and then this routine is finished.

[Routine for Performing Cylinder Air-Fuel Ratio Control]

The routine for performing cylinder air-fuel ratio control shown in FIG. 3 is a subroutine performed in step 104 of the main routine for cylinder air-fuel ratio control shown in FIG. 2. In step 201, the output of the air-fuel ratio sensor 37 (detection value of air-fuel ratio) is read. Then, the routine proceeds to step 202 where the air-fuel ratio of a cylinder, the air fuel ratio of which is to be estimated this time, is estimated by the use of the air-fuel ratio estimation model on the basis of the detection value of the air-fuel ratio sensor 37. Then, the routine proceeds to step 203 where the average value of estimated air-fuel ratios of all cylinders is computed and is set as a reference air-fuel ratio (target air-fuel ratio of all cylinders).

Then, the routine proceeds to step 204 where the deviation between the estimated air-fuel ratio of each cylinder and the reference air-fuel ratio is computed and where the cylinder air-fuel ratio correction quantity (fuel correction quantity of each cylinder) is computed so as to reduce the deviation. Then, the routine proceeds to step 205 where a routine for learning cylinder air-fuel ratio correction quantity shown in FIG. 4, which will be described later, is performed to learn a cylinder air-fuel ratio correction quantity.

In the next step 206, the fuel injection quantity of each cylinder is corrected by the use of the cylinder air-fuel ratio correction quantity of each cylinder and its learning value to correct the air-fuel ratio of the air-fuel mixture, which is to be supplied to each cylinder, for each cylinder. In this manner, the air-fuel ratio of each cylinder is controlled so as to reduce variations in the air-fuel ratio between the cylinders.

[Routine for Learning Cylinder Air-Fuel Ratio Correction Quantity]

Figure 4:
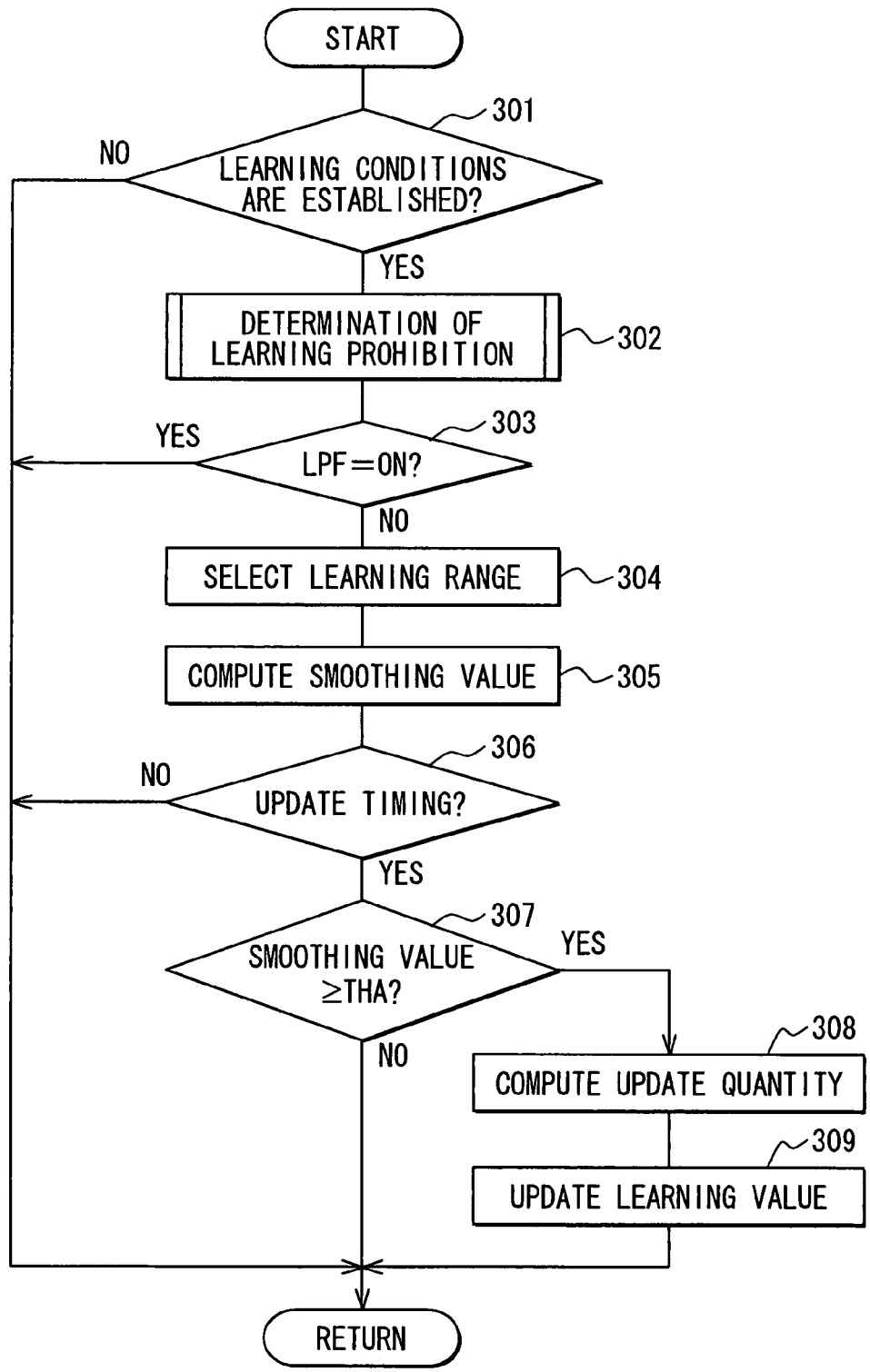
FIG. 4 is a flow chart showing the flow of processing of a routine for learning a cylinder air-fuel ratio correction quantity in the first embodiment.

A routine for learning cylinder air-fuel ratio correction quantity, shown in FIG. 4, is a subroutine performed in step 205 of the routine for performing cylinder air-fuel ratio control, shown in FIG. 3. When this routine is started, first in step 301, it is determined whether conditions for performing learning hold. Here, the conditions for performing learning include, for example, the following two conditions (1) and (2).

(1) The cylinder air-fuel ratio control is being performed.
(2) The engine is operated in a stable operating state in which a change in air-fuel ratio is a specified value or less.

When both of the foregoing two conditions (1) and (2) are satisfied, the conditions for performing learning hold. When any one of the conditions is not satisfied, the conditions for performing learning do not hold. When these conditions for performing learning do not hold, this routine is finished without performing the next and subsequent processings.

On the other hand, when the conditions for performing learning hold, the routine proceeds to step 302 where a routine for determining prohibition of learning, which will be described in FIG. 5, is performed to determine whether the cylinder air-fuel ratio correction quantity of any cylinder is outside a specified range (outside an allowable range). When a state in which the cylinder air-fuel ratio correction quantity of any cylinder is outside the specified range continues for a specified time, a learning prohibition flag LPF is set ON, which means the prohibition of learning.

[A0041]

In the next step 303, it is determined whether the learning prohibition flag LPF is set ON, which means the prohibition of learning. When the learning prohibition flag LPF is set ON (learning is prohibited), this routine is finished without performing the next and subsequent processings. With this, the learning of the cylinder air-fuel ratio correction quantity AFCQ is prohibited.

Figure 7:
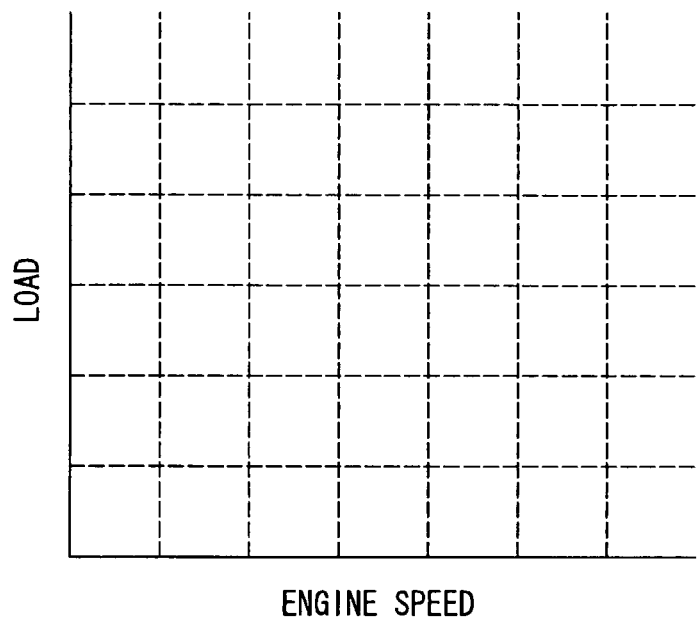
FIG. 7 is a diagram for conceptually showing a map for learning a cylinder air-fuel ratio correction quantity in the first embodiment.

On the contrary, when the learning prohibition flag LPF is OFF (learning is allowed), the routine proceeds to step 304 where a learning range (learning range for updating a learning value of a cylinder air-fuel ratio correction quantity AFCQ) corresponding to the present engine operating range (engine revolution speed and load) is selected in a map for learning a cylinder air-fuel ratio correction quantity AFCQ, the map being stored in the rewritable nonvolatile memory (not shown) of the ECU 40 and shown in FIG. 7. Then, the routine proceeds to step 305 where the smoothing value of the cylinder air-fuel ratio correction quantity AFCQ is computed for each cylinder by the following equation by the use of a smoothing coefficient K.

Smoothing value of cylinder air-fuel ratio correction quantity AFCQ={last smoothing value×(K−1)+ cylinder air-fuel ratio correction quantity AFCQ of this time}/K Then, the routine proceeds to step 306 where it is determined whether this is the timing of updating the learning value of the cylinder air-fuel ratio correction quantity AFCQ. This timing of updating the learning value is set in such a way that a period of updating a learning value is longer than at least a period of computing a cylinder air-fuel ratio correction quantity AFCQ. When it is determined in this step 306 that this timing is not the timing of updating the learning value, this routine is finished without performing any processing.

On the other hand, when it is determined in step 306 that this is the timing of updating a learning value, the routine proceeds to step 307 where it is determined whether the absolute value of the smoothing value of the cylinder air-fuel ratio correction quantity AFCQ is a specified value THA or more. When the absolute value of the smoothing value of the cylinder air-fuel ratio correction quantity AFCQ is smaller than the specified value THA, it is determined that the learning value does not need to be updated and then this routine is finished.

Moreover, when it is determined in step 307 that the absolute value of the smoothing value of the cylinder air-fuel ratio correction quantity AFCQ is not smaller than the specified value THA, the routine proceeds to step 308 where a learning value update quantity is computed by a map on the basis of the smoothing value of the cylinder air-fuel ratio correction quantity AFCQ. The map used for computing this learning value update quantity is set in such a way that as the smoothing value of the cylinder air-fuel ratio correction quantity AFCQ becomes larger, the learning value update quantity becomes larger.

Then, the routine proceeds to step 309 where a value found by adding a learning value update quantity of this time to the last learning value of the cylinder air-fuel ratio correction quantity AFCQ is updated and stored as a new learning value of the cylinder air-fuel ratio correction quantity AFCQ in the rewritable non-volatile memory (not shown) of the ECU 40. At this time, the learning value in a learning range selected in the step 304 of the map for learning the cylinder air-fuel ratio correction quantity AFCQ shown in FIG. 7 is updated. The map for learning the cylinder air-fuel ratio correction quantity AFCQ shown in FIG. 7 is made for each cylinder.

[Routine for Determining Prohibition of Learning]

A routine for determining prohibition of learning shown in FIG. 5 is a subroutine performed in step 302 of the routine for learning a cylinder air-fuel ratio correction quantity AFCQ, shown in FIG. 4.

In step 401, the cylinder air-fuel ratio correction quantity AFCQ of each cylinder is read. Then, in step 402, it is determined whether the cylinder air-fuel ratio correction quantity AFCQ of any cylinder is outside a specified range (outside allowable range). When the cylinder air-fuel ratio correction quantities of all cylinders are within the specified range, the learning of the cylinder air-fuel ratio correction quantity AFCQ is allowed. In this case, the routine proceeds to step 406 where the value of a delay time counter T is reset to "0", the delay time counter T counting a period of time during which a state in which the cylinder air-fuel ratio correction quantity AFCQ is outside the specified range continues, and then this routine is finished.

On the other hand, when it is determined in the step 402 that the cylinder air-fuel ratio correction quantity AFCQ of any cylinder is outside the specified range, the routine proceeds to step 403 where the delay time counter T counts a period of time during which a state in which the cylinder air-fuel ratio correction quantity AFCQ is outside the specified range continues. Then, the routine proceeds to step 404 where it is determined whether the count value of the delay time counter T is larger than a specified value α. When the count value of the delay time counter T is not larger than the specified value α, this routine is finished without performing any processing. Then, when the count value of the delay time counter T becomes larger than the specified value, the routine proceeds to step 405 where a learning prohibition flag LPF is set ON (learning is prohibited) and then this routine is finished.

A control example of this first embodiment described above will be described by the use of a time chart shown in FIG. 6.

In the example shown in FIG. 6, at time t1, the conditions for performing the cylinder air-fuel ratio control hold and the cylinder air-fuel ratio control is started to compute the cylinder air-fuel ratio correction quantities of the cylinders #1 to #4. While the cylinder air-fuel ratio control is performed, it is determined whether the cylinder air-fuel ratio correction quantities of the cylinders #1 to #4 are outside the specified range R. At time t2 when the cylinder air-fuel ratio correction quantity AFCQ of any cylinder (cylinder #1 in the example shown in FIG. 6) is outside the specified range R, the delay time counter T starts the counting-up operation to count the period of time during which the state in which the cylinder air-fuel ratio correction quantity AFCQ of the cylinder is outside the specified range R continues.

Then, at time t3 when the count value of the delay time counter T becomes larger than specified value, the learning prohibition flag LPF is set ON (learning is prohibited). Then, the learning of the cylinder air-fuel ratio correction quantity AFCQ is prohibited.

According to this first embodiment described above, when the state in which the cylinder air-fuel ratio correction quantity AFCQ of any cylinder is outside the specified range continues for a while, the learning of the cylinder air-fuel ratio correction quantity AFCQ is prohibited, so the erroneous learning of the cylinder air-fuel ratio correction quantity AFCQ can be prevented. Thus, a deterioration of the accuracy of the cylinder air-fuel ratio control can be prevented.

Here, the present invention is not limited to a construction in which when the state in which the cylinder air-fuel ratio correction quantity AFCQ of any one of the cylinders is outside the specified range continues for a while, the learning of the cylinder air-fuel ratio correction quantity AFCQ is prohibited. The present invention may employ a construction in which when the state in which the cylinder air-fuel ratio correction quantities of any two or more cylinders are outside the specified range continues for a while, the learning of the cylinder air-fuel ratio correction quantity AFCQ is prohibited.

Moreover, the present invention may employ a construction in which the learning of the cylinder air-fuel ratio correction quantity AFCQ is prohibited only for a cylinder or a group of cylinders in which the cylinder air-fuel ratio correction quantity AFCQ is outside the specified range. With this construction, the learning of the cylinder air-fuel ratio correction quantity AFCQ is prohibited only for the cylinder or the group of cylinders in which the cylinder air-fuel ratio correction quantity AFCQ is outside the specified range to prevent the erroneous learning of the cylinder air-fuel ratio correction quantity AFCQ, whereas the learning of the cylinder air-fuel ratio correction quantity AFCQ is continuously performed for a cylinder or a group of cylinders in which the cylinder air-fuel ratio correction quantity AFCQ is within the specified range, which can increase the learning accuracy of the cylinder air-fuel ratio correction quantity AFCQ.

Second Embodiment

In the routine for learning the cylinder air-fuel ratio correction quantity AFCQ shown in FIG. 4, which has been described in the first embodiment, the learning value of the cylinder air-fuel ratio correction quantity AFCQ is updated for each engine operating range (engine revolution speed and load) (see FIG. 7).

Figure 9:
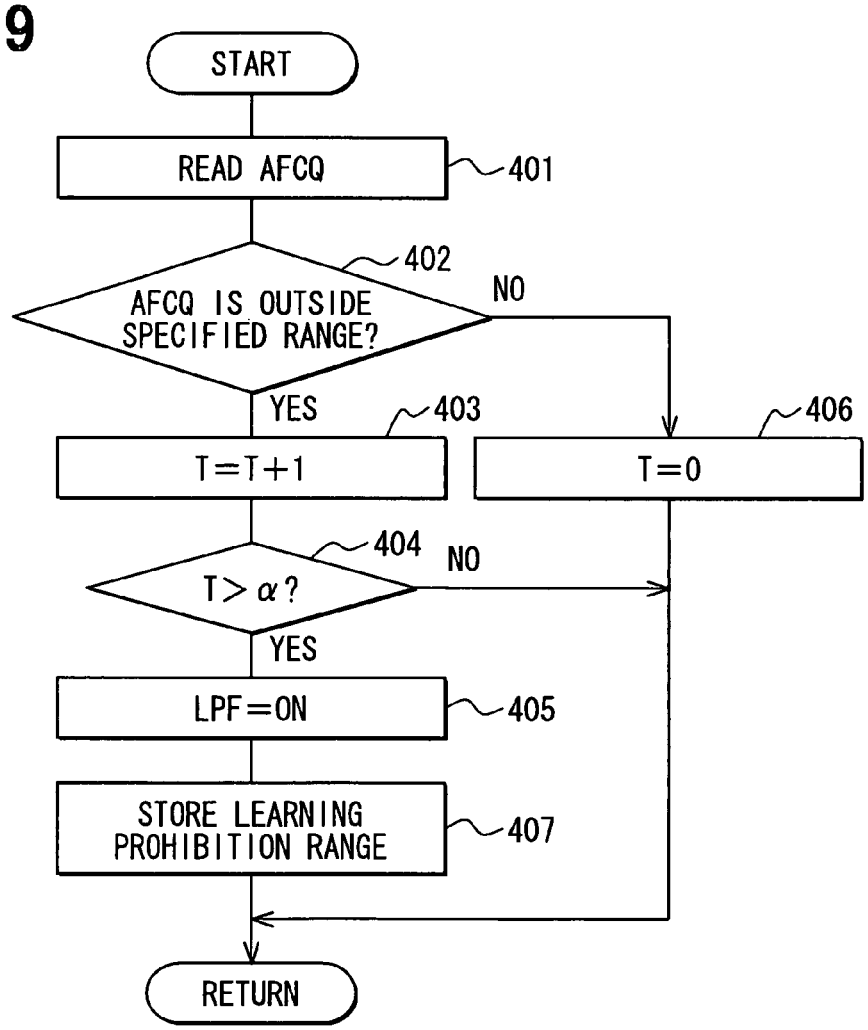
FIG. 9 is a flow chart showing the flow of processing of a routine for determining prohibition of learning in the second embodiment.
Figure 8:
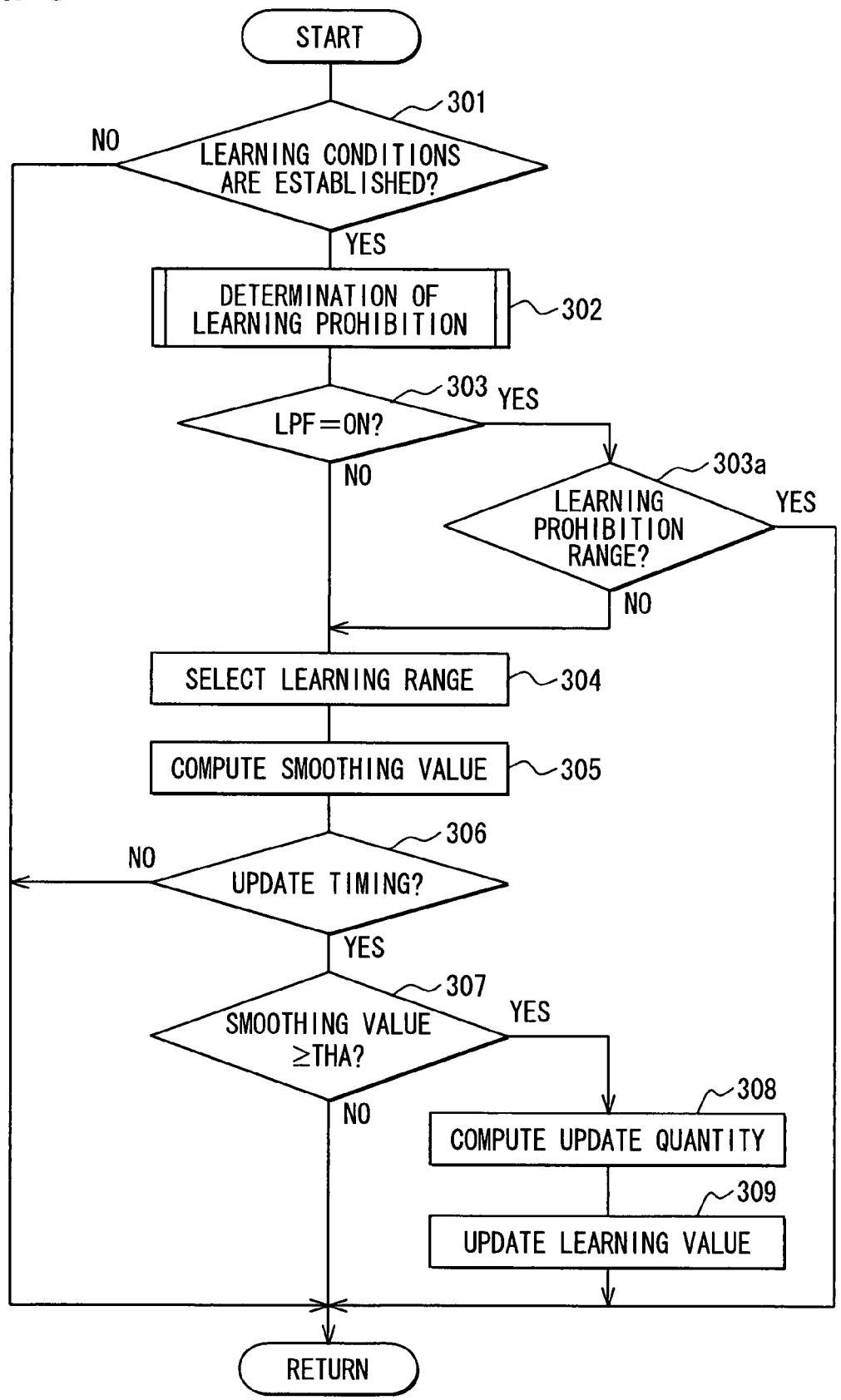
FIG. 8 is a flow chart showing the flow of processing of a routine for learning a cylinder air-fuel ratio correction quantity in a second embodiment.

[A0056]
In consideration of this point, in an second embodiment of the present invention shown in FIG. 8 and FIG. 9, when the cylinder air-fuel ratio correction quantity AFCQ of any cylinder is outside the specified range, the learning of the cylinder air-fuel ratio correction quantity AFCQ is prohibited only in an operating range in which the cylinder air-fuel ratio correction quantity AFCQ of any cylinder is outside the specified range and the learning of the cylinder air-fuel ratio correction quantity AFCQ is allowed in an operating range other than the operating range.

Processing contents of a routine shown in FIG. 8 and FIG. 9 performed in this second embodiment will be described below. A routine for learning a cylinder air-fuel ratio correction quantity AFCQ shown in FIG. 8 is different from the routine for learning a cylinder air-fuel ratio correction quantity AFCQ, which has been described in the first embodiment and is shown in FIG. 4, only in that determination processing in step 303a is appended to the step 303 of the routine shown in FIG. 4, and is the same in the processings of the other steps as the routine.

In the routine for learning a cylinder air-fuel ratio correction quantity AFCQ, shown in FIG. 8, when it is determined in step 301 that the conditions for performing learning hold, the routine proceeds to step 302 where a routine for determining prohibition of learning, which will be described later and is shown in FIG. 9.

Then, it is determined in the next step 303 whether a learning prohibition flag LPF is set ON, which means the prohibition of learning. When the learning prohibition flag LPF is set ON (learning is prohibited), the routine proceeds to step 303a where it is determined whether the present engine operating range (engine revolution speed and load) is a learning prohibition range stored by the routine for determining prohibition of learning, which is shown in FIG. 9 and will be described later. As a result, when the present engine operating range is a learning prohibition range, this routine is finished without performing the next and subsequent processings. With this, the learning of a cylinder air-fuel ratio correction quantity AFCQ is prohibited only in the learning prohibition range.

In contrast to this, when it is determined in the step 303a that the present engine operating range is not a learning prohibition range, it is determined that the cylinder air-fuel ratio correction quantity AFCQ can be learned and the routine proceeds to processings in the step 304 and its subsequent steps where the learning value of the cylinder air-fuel ratio correction quantity AFCQ in a learning range corresponding to the present engine operating range is updated by the same method as in the first embodiment.

The routine for determining prohibition of learning shown in FIG. 9 is a subroutine performed in step 302 of the routine for learning a cylinder air-fuel ratio shown in FIG. 8. The subroutine is different from the routine for determining prohibition of learning, which has been described in the first embodiment and is shown in FIG. 5, only in that processing in step 407 is appended to step 405 of the routine shown in FIG. 5, and is the same in the processing of the other steps as the routine.

In the routine for determining prohibition of learning shown in FIG. 9, when a state in which the cylinder air-fuel ratio correction quantity AFCQ of any cylinder is outside the specified range continues for a specified time, the learning prohibition flag LPF is set ON (learning is prohibited). Then, the routine proceeds to step 407 where the present engine operating range is stored as a learning prohibition range in the rewritable non-volatile memory (not shown) of the ECU 40. Thereafter, the learning of the cylinder air-fuel ratio correction quantity AFCQ is prohibited only in this learning prohibition range.

In the second embodiment described above, the learning of the cylinder air-fuel ratio correction quantity AFCQ is prohibited only in an operating range in which the cylinder air-fuel ratio correction quantity AFCQ of any cylinder is outside the specified range to prevent the erroneous learning of the cylinder air-fuel ratio correction quantity AFCQ, whereas the learning of the cylinder air-fuel ratio correction quantity AFCQ can be continued in the other range in which the cylinder air-fuel ratio correction quantity AFCQ is within the specified range. Therefore, the learning accuracy of the cylinder air-fuel ratio correction quantity AFCQ can be enhanced.

The present invention is not limited to a construction in which the learning of the cylinder air-fuel ratio correction quantity AFCQ is prohibited only in an operating range in which the cylinder air-fuel ratio correction quantity AFCQ of any one of the cylinders is outside the specified range. The present invention may employ a construction in which only in an operating range in which the cylinder air-fuel ratio correction quantities of any two or more cylinders are outside the specified range, the learning of the cylinder air-fuel ratio correction quantity AFCQ is prohibited.

Third Embodiment

Figure 10:
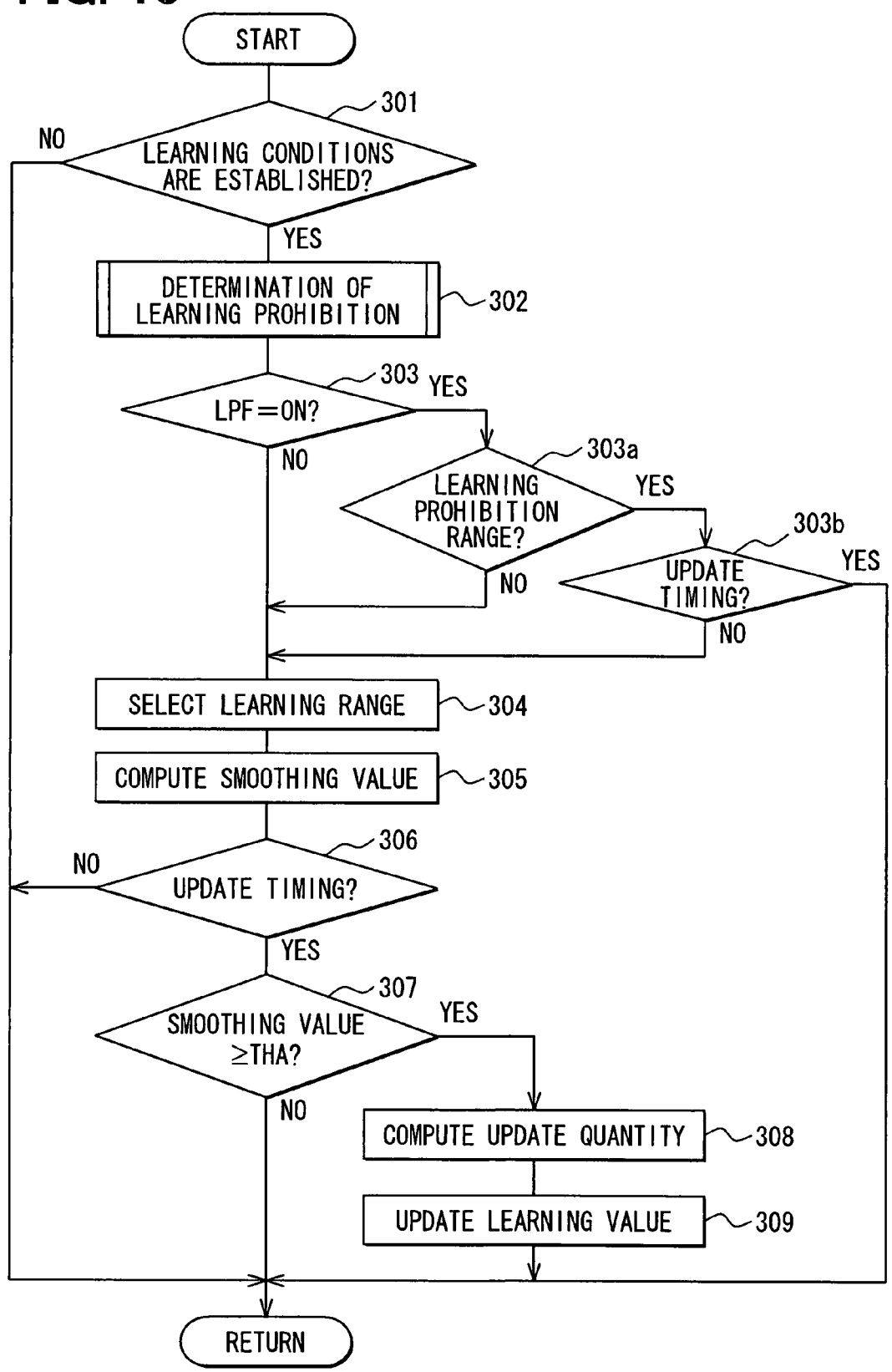
FIG. 10 is a flow chart showing the flow of processing of a routine for learning a cylinder air-fuel ratio correction quantity in an third embodiment.
Figure 11:
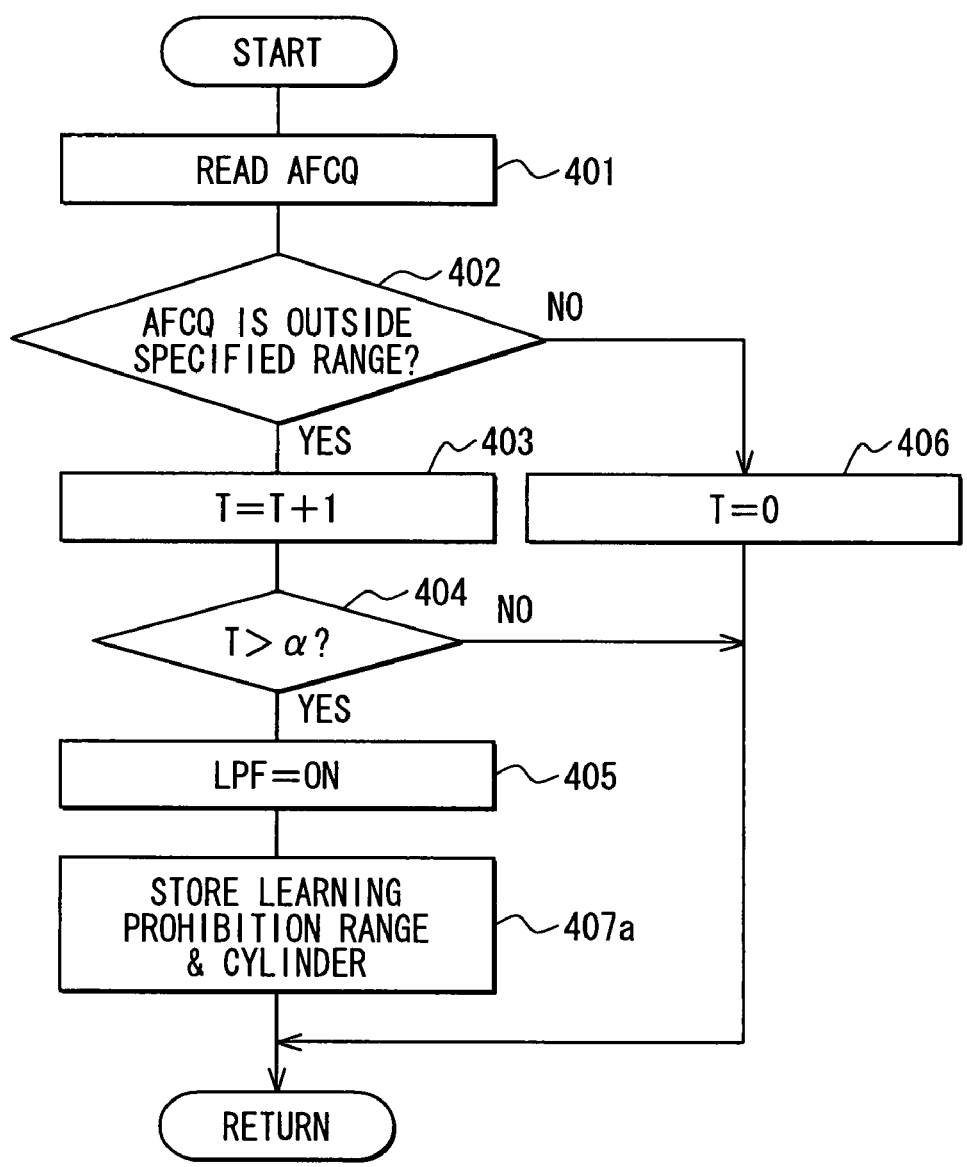
FIG. 11 is a flow chart showing the flow of processing of a routine for determining prohibition of learning in the third embodiment.

In an third embodiment of the present invention, shown in FIG. 10 and FIG. 11, in an operating range in which the cylinder air-fuel ratio correction quantity AFCQ of any cylinder is outside the specified range, the learning of the cylinder air-fuel ratio correction quantity AFCQ is prohibited only for a cylinder for which the cylinder air-fuel ratio correction quantity AFCQ is outside the specified range.

A routine for learning a cylinder air-fuel ratio correction quantity AFCQ, shown in FIG. 10, is different from the routine for learning a cylinder air-fuel ratio correction quantity AFCQ, which has been described in the second embodiment and is shown in FIG. 8, only in that determination processing in step 303b is appended to the step 303a of the routine shown in FIG. 8, and is the same in the processing of the other steps as the routine.

In the routine for learning a cylinder air-fuel ratio correction quantity AFCQ, shown in FIG. 10, when it is determined in step 301 that the conditions for performing learning hold, the routine proceeds to step 302 where a routine for determining prohibition of learning is performed, the routine being described later and shown in FIG. 11.

In the next step 303, it is determined whether the learning prohibition flag LPF is set ON, which means the prohibition of learning. When the learning prohibition flag LPF is set ON (learning is prohibited), the routine proceeds to step 303a where it is determined whether the present engine operating range (engine revolution speed and load) is a learning prohibition range stored by the routine for determining prohibition of learning which will be described later and is shown in FIG. 11. As a result, when it is determined that the present engine operating range is the learning prohibition range, the routine proceeds to step 303b where it is determined whether this is timing for updating the learning value of the cylinder air-fuel ratio correction quantity AFCQ of a learning prohibition cylinder stored by the routine for determining prohibition of learning, the routine being described later and shown in FIG. 11. When this is the timing for updating the learning value of the cylinder air-fuel ratio correction quantity AFCQ of the learning prohibition cylinder, this routine is finished without performing the next and subsequent processings. With this, the learning of the cylinder air-fuel ratio correction quantity AFCQ is prohibited only in the learning prohibition range of the map for learning a cylinder air-fuel ratio correction quantity AFCQ of the learning prohibition cylinder (see FIG. 7).

In contrast to this, when determination in the foregoing steps 303a or step 303b is "NO", in other words, the present engine operating range is not the learning prohibition range, or when this is not the timing for updating the learning value of the cylinder air-fuel ratio correction quantity AFCQ of the learning prohibition cylinder, it is determined that the cylinder air-fuel ratio correction quantity AFCQ can be learned and the routine proceeds to processings in step 304 and in its subsequent steps. Then, the learning value of the cylinder air-fuel ratio correction quantity AFCQ in a learning range corresponding to the present engine operating range of the map for leaning a cylinder air-fuel ratio correction quantity AFCQ of a cylinder for which learning is allowed is updated by the same method as in the first embodiment.

The routine for determining prohibition of learning, shown in FIG. 11, is a subroutine performed in step 302 of the routine for learning a cylinder air-fuel ratio correction quantity AFCQ, shown in FIG. 10. The subroutine is different from the routine for determining prohibition of learning, which has been described in the second embodiment and is shown in FIG. 9, only in that processing in step 407 of the routine shown in FIG. 9 is changed to processing in step 407a of the subroutine, and is the same in the processing of the other steps as the routine shown in FIG. 9.

In the routine for determining prohibition of learning shown in FIG. 11, by the processing in steps 401 to 405, the learning prohibition flag LPF is set ON (learning is prohibited) when a state in which the cylinder air-fuel ratio correction quantity AFCQ of any cylinder is outside the specified range continues for the specified time. Then, the routine proceeds to step 407a where the present operating range is stored as a learning prohibition range and a cylinder for which the cylinder air-fuel ratio correction quantity AFCQ is outside the specified range is stored as a learning prohibition cylinder. Thereafter, the learning of the cylinder air-fuel ratio correction quantity AFCQ is prohibited only in the learning prohibition range of the map for learning a cylinder air-fuel ratio correction quantity AFCQ of this learning prohibition cylinder.

In this third embodiment described above, the learning of the cylinder air-fuel ratio correction quantity AFCQ is prohibited only for a cylinder for which the cylinder air-fuel ratio correction quantity AFCQ is outside the specified range in an operating range in which the cylinder air-fuel ratio correction quantity AFCQ of any cylinder is outside the specified range. Hence, the operating range and the cylinder in which the learning of the cylinder air-fuel ratio correction quantity AFCQ is prohibited can be minimized. Therefore, the learning accuracy of the cylinder air-fuel ratio correction quantity AFCQ can be enhanced.

The present invention is not limited to a construction in which the learning of the cylinder air-fuel ratio correction quantity AFCQ is prohibited in an operating range in which the cylinder air-fuel ratio correction quantity AFCQ of any one of the cylinders is outside the specified range only for the one cylinder. The present invention may employ a construction in which in an operating range in which the cylinder air-fuel ratio correction quantities of any two or more cylinders are outside the specified range, the learning of the cylinder air-fuel ratio correction quantities of the two or more cylinders is prohibited.

Moreover, in an operating range in which the cylinder air-fuel ratio correction quantity AFCQ of any cylinder is outside the specified range, the learning of the cylinder air-fuel ratio correction quantity AFCQ may be prohibited for a group of cylinders to which the cylinder belongs.

Fourth Embodiment

In the embodiments 1 to 3, when the cylinder air-fuel ratio correction quantity AFCQ of any cylinder is outside the specified range, the learning of the cylinder air-fuel ratio correction quantity AFCQ is prohibited. However, a construction may be employed in which when the learning value of the cylinder air-fuel ratio correction quantity AFCQ of any cylinder is outside the specified range, the learning of the cylinder air-fuel ratio correction quantity AFCQ is prohibited. A fourth embodiment of the present invention in which this construction is embodied will be described.

Figure 12:
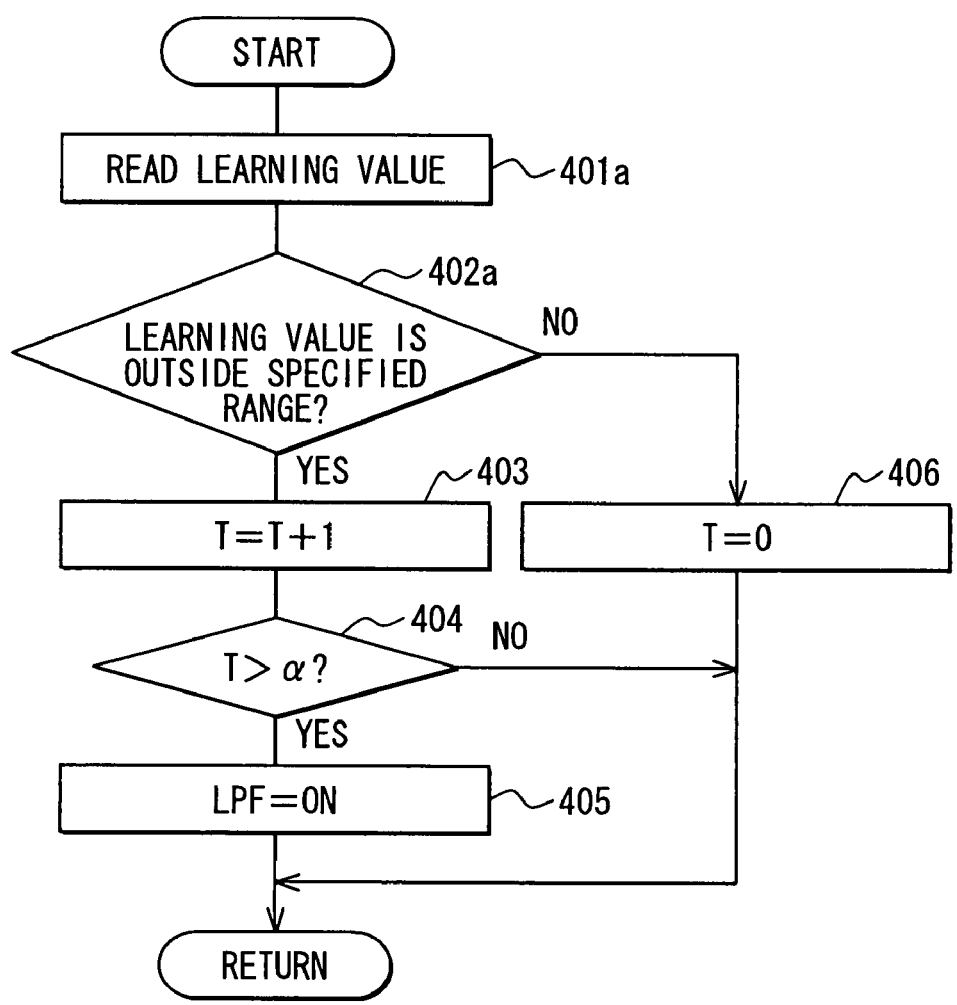
FIG. 12 is a flow chart showing the flow of processing of a routine for determining prohibition of learning in an fourth embodiment.

In the fourth embodiment, a routine for determining prohibition of learning shown in FIG. 12 is performed. First, the learning value of the cylinder air-fuel ratio correction quantity AFCQ is read (step 401a) and it is determined whether the learning value of the cylinder air-fuel ratio correction quantity AFCQ of any cylinder is outside the specified range (step 402a). When the count value of the delay time counter T is larger than a specified value, the delay time counter T counting a period of time during which a state in which the learning value of the cylinder air-fuel ratio correction quantity AFCQ of any cylinder is outside the specified range continues, the learning prohibition flag LPF is set ON, which means the prohibition of learning (steps 403 to 405). Processings other than this processing are the same as in the first embodiment.

A control example of this fourth embodiment will be described with reference to a time chart shown in FIG. 13.

Figure 13:
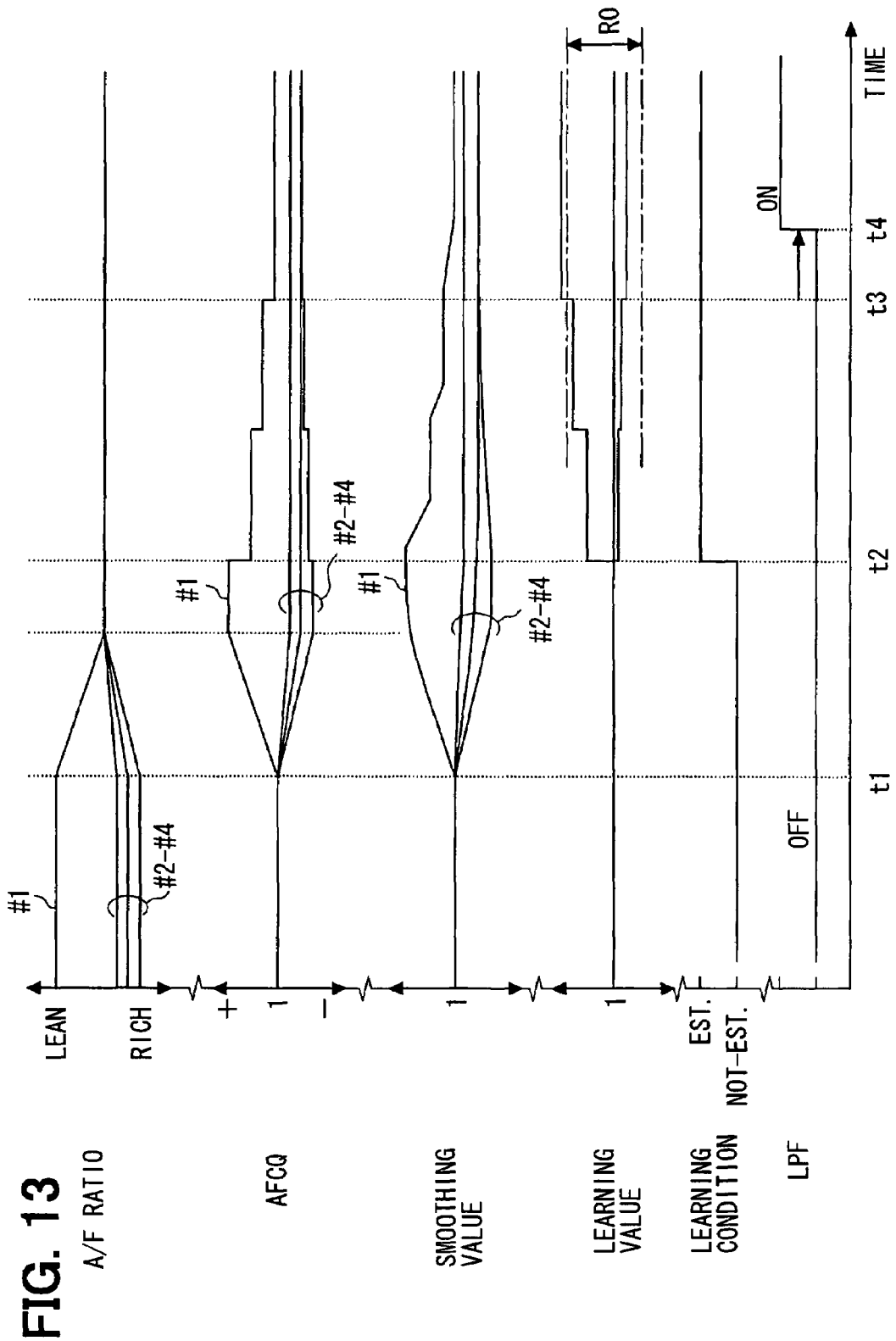
FIG. 13 is a time chart showing a control example in the fourth embodiment.

In the example shown in FIG. 13, at time t1, the conditions for performing the cylinder air-fuel ratio control hold and the cylinder air-fuel ratio control is started and the cylinder air-fuel ratio correction quantities of the respective cylinders #1 to #4 are computed.

Thereafter, at time t2, the conditions for performing learning hold and the learning of the cylinder air-fuel ratio correction quantity AFCQ is started and the learning values of the cylinder air-fuel ratio correction quantities of the respective cylinders #1 to #4 are updated.

Then, it is determined whether the learning values of the cylinder air-fuel ratio correction quantities of the respective cylinders #1 to #4 are outside the specified value R0 (outside the allowable range R0). At the time t3 when the learning value of the cylinder air-fuel ratio correction quantity AFCQ of any cylinder becomes outside the specified value, the delay time counter T starts a counting-up operation to count a period of time during which a state continues in which the learning value of the cylinder air-fuel ratio correction quantity AFCQ of any cylinder is outside the specified value R0.

Then, at the time t4 when the count value of the delay time counter T becomes larger than a specified time, the learning prohibition flag LPF is set ON (learning is prohibited). Thereafter, the learning of the learning value of the cylinder air-fuel ratio correction quantity AFCQ is prohibited.

Also in this fourth embodiment described above, the same effect as in the first embodiment can be produced.

The present invention is not limited to a construction in which when a state in which the learning value of the cylinder air-fuel ratio correction quantity AFCQ of any one of the cylinders is outside the specified range continues for a while, the learning of the cylinder air-fuel ratio correction quantity AFCQ is prohibited. The present invention may employ a construction in which when a state in which the learning values of the cylinder air-fuel ratio correction quantities of any two or more cylinders are outside the specified range continues for a while, the learning of the cylinder air-fuel ratio correction quantity AFCQ is prohibited.

Moreover, the present invention may employ a construction in which the learning of the cylinder air-fuel ratio correction quantity AFCQ is prohibited only for a cylinder or a group of cylinders for which the learning value of the cylinder air-fuel ratio correction quantity AFCQ is outside the specified value. With this, the learning of the cylinder air-fuel ratio correction quantity AFCQ is prohibited only for the cylinder or the group of cylinders for which the learning value of the cylinder air-fuel ratio correction quantity AFCQ is outside the specified value, whereas the learning of the cylinder air-fuel ratio correction quantity AFCQ is continued for other cylinders or a group of other cylinders for which the learning value of the cylinder air-fuel ratio correction quantity AFCQ is within the specified value. Thus, the learning accuracy of the cylinder air-fuel ratio correction quantity AFCQ can be enhanced.

Fifth Embodiment

In an fifth embodiment of the present invention, shown in FIG. 4, when the cylinder air-fuel ratio correction quantity AFCQ of any cylinder is outside the specified range (allowable range), the learning of the cylinder air-fuel ratio correction quantity AFCQ is prohibited only in an operating range in which the learning value of the cylinder air-fuel ratio correction quantity AFCQ is outside the specified range. In an operating range other than the operating range, the learning of the cylinder air-fuel ratio correction quantity AFCQ is allowed.

Figure 14:
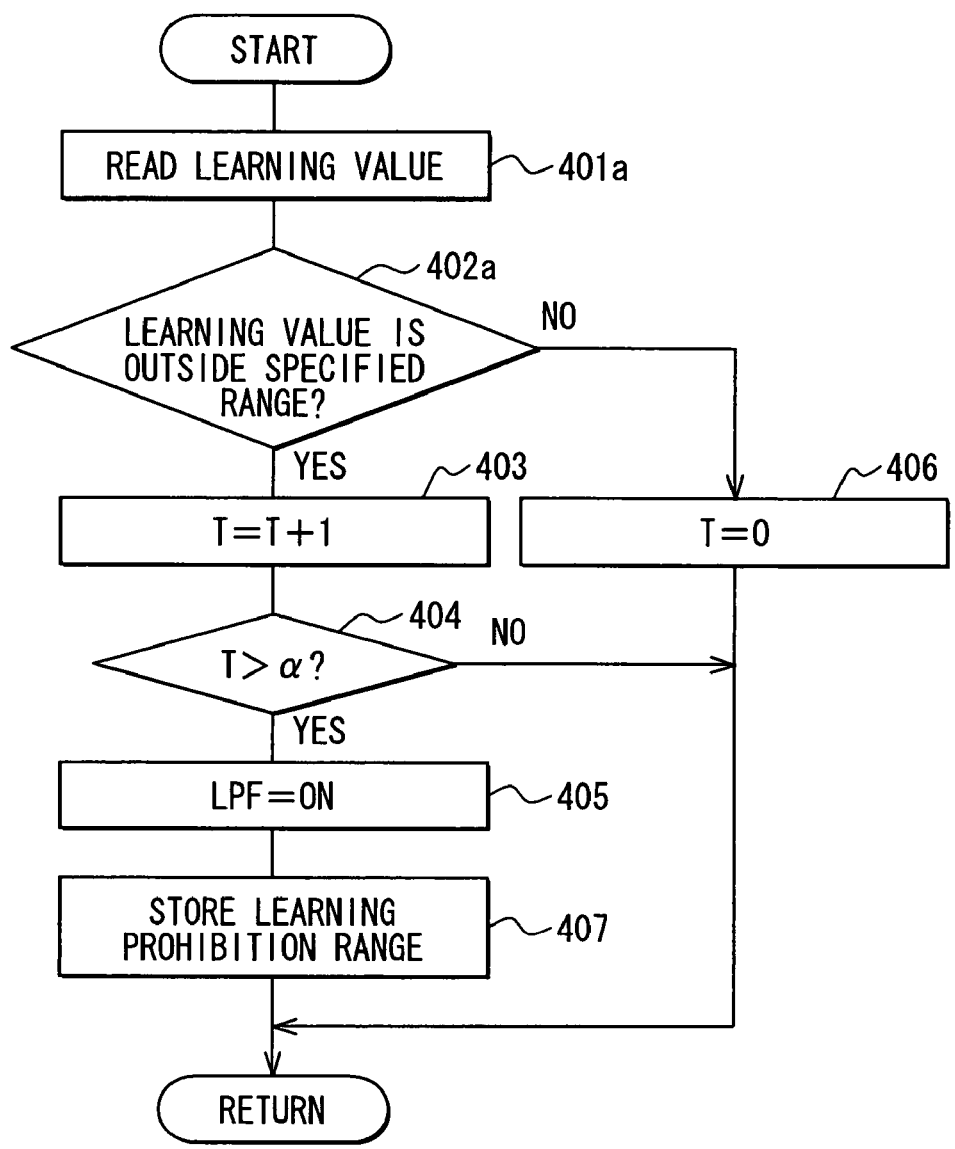
FIG. 14 is a flow chart showing the flow of processing of a routine for determining prohibition of learning in an fifth embodiment.

A routine for learning a cylinder air-fuel ratio correction quantity AFCQ, which is performed in this fifth embodiment and is shown in FIG. 14, is different from the routine for determining prohibition of learning, which has been described in the fourth embodiment and is shown in FIG. 12, only in that processing in step 407 is appended to the step 405 of the routine shown in FIG. 12, and is the same in the processing of the other steps as the routine shown in FIG. 12.

In the routine for determining prohibition of learning shown in FIG. 14, when a state in which the cylinder air-fuel ratio correction quantity AFCQ of any cylinder is outside of the specified range continues for the specified time, the learning prohibition flag LPF is set ON (learning is prohibited) by the processing in steps 401*a* to 405. Then, the routine proceeds to step 407 where the present operating range is stored as a learning prohibition range in the rewritable non-volatile memory (not shown) of the ECU 40. Thereafter, the learning of the cylinder air-fuel ratio correction quantity AFCQ is prohibited only in this learning prohibition range. In this fifth embodiment, the routine for learning a cylinder air-fuel ratio correction quantity AFCQ is performed, the routine having been described in the second embodiment and being shown in FIG. 8.

In this fifth embodiment described above, the learning of the cylinder air-fuel ratio correction quantity AFCQ is prohibited only in an operating range in which the cylinder air-fuel ratio correction quantity AFCQ of any cylinder is outside the specified range to prevent the erroneous learning of the cylinder air-fuel ratio correction quantity AFCQ, whereas the learning of the cylinder air-fuel ratio correction quantity AFCQ can be continued in the other operating range in which the learning value of the cylinder air-fuel ratio correction quantity AFCQ is within the specified range. Therefore, the learning accuracy of the cylinder air-fuel ratio correction quantity AFCQ can be enhanced.

The present invention is not limited to a construction in which the learning of the cylinder air-fuel ratio correction quantity AFCQ is prohibited only in an operating range in which the cylinder air-fuel ratio correction quantity AFCQ of any one of the cylinders is outside the specified range. The present invention may employ a construction in which only in an operating range in which the cylinder air-fuel ratio correction quantities of any two or more cylinders are outside the specified range, the learning of the cylinder air-fuel ratio correction quantities of the two or more cylinders is prohibited.

Sixth Embodiment

Figure 15:
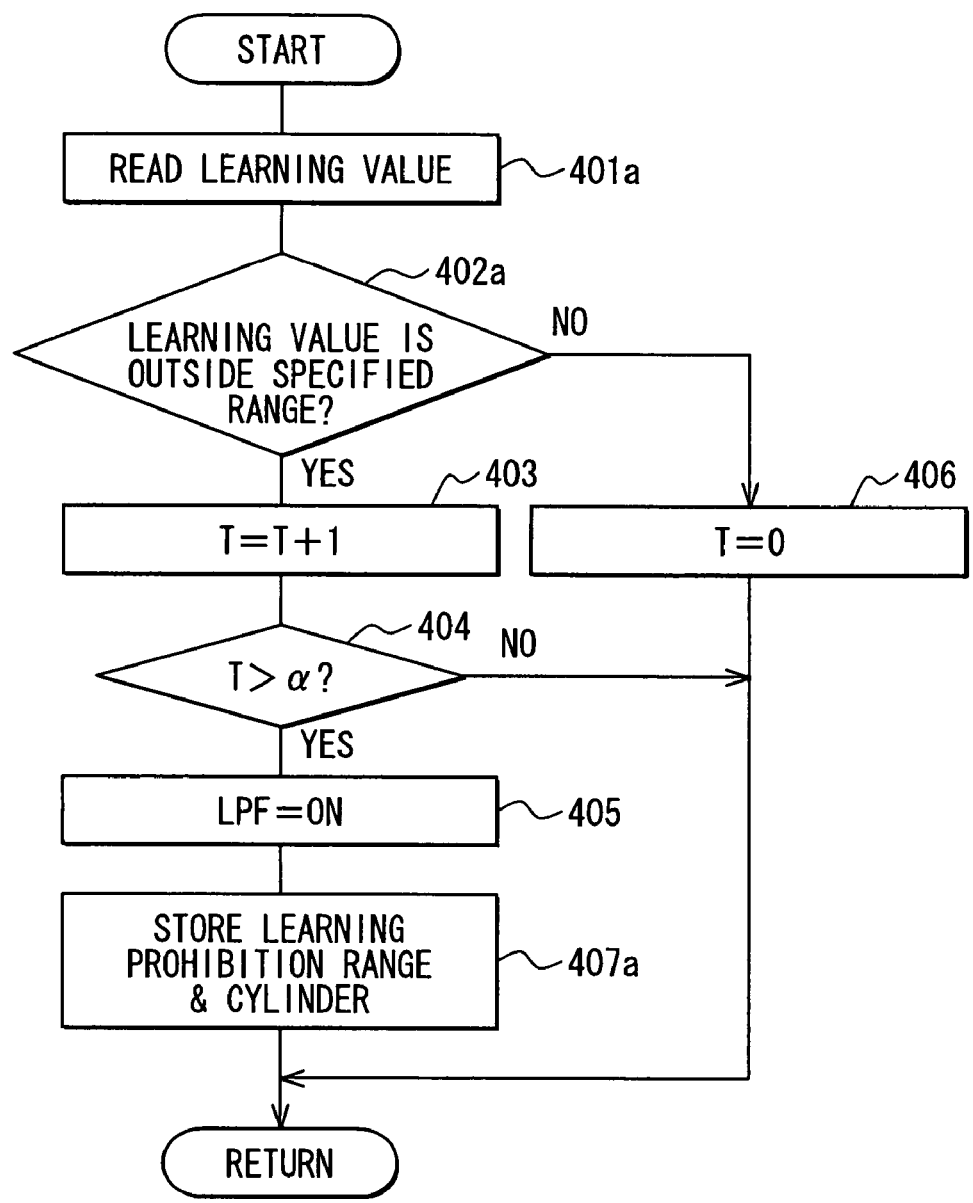
FIG. 15 is a flow chart showing the flow of processing of a routine for determining prohibition of learning in an sixth embodiment.

In an sixth embodiment of the present invention, shown in FIG. 15, in an operating range in which the cylinder air-fuel ratio correction quantity AFCQ of any cylinder is outside the specified range, the learning of the cylinder air-fuel ratio correction quantity AFCQ is prohibited only for a cylinder for which the cylinder air-fuel ratio correction quantity AFCQ is outside the specified range.

A routine for determining prohibition of learning, shown in FIG. 15, is different from the routine for determining prohibition of learning, which has been described in the fifth embodiment and is shown in FIG. 14, only in that processing in step 407*a* is changed to processing in the step 407 of the routine shown in FIG. 14, and is the same in the processing of the other steps as the routine shown in FIG. 14.

In the routine for determining prohibition of learning shown in FIG. 15, when a state in which the cylinder air-fuel ratio correction quantity AFCQ of any cylinder is outside the specified range continues for the specified time, the learning prohibition flag LPF is set ON (learning is prohibited) by the processing in steps 401 to 405. Then, the routine proceeds to step 407*a* where the present operating range is stored as a learning prohibition range and a cylinder for which the cylinder air-fuel ratio correction quantity AFCQ is outside the specified range is stored as a learning prohibition cylinder. Thereafter, the learning of the cylinder air-fuel ratio correction quantity AFCQ is prohibited only in the learning prohibition range of the map for learning a cylinder air-fuel ratio correction quantity AFCQ of this learning prohibition cylinder.

In this sixth embodiment, the routine for learning a cylinder air-fuel ratio correction quantity AFCQ is performed, the routine having been described in the third embodiment and being shown in FIG. 10.

In this sixth embodiment described above, the learning of the cylinder air-fuel ratio correction quantity AFCQ is prohibited only for a cylinder for which the cylinder air-fuel ratio correction quantity AFCQ is outside the specified range in an operating range in which the cylinder air-fuel ratio correction quantity AFCQ of any cylinder is outside the specified range. Hence, the operating range and the cylinder in which the learning of the cylinder air-fuel ratio correction quantity AFCQ is prohibited can be minimized. Therefore, the learning accuracy of the cylinder air-fuel ratio correction quantity AFCQ can be enhanced.

The present invention is not limited to a construction in which in an operating range in which the cylinder air-fuel ratio correction quantity AFCQ of any one of the cylinders is outside the specified range, the learning of the cylinder air-fuel ratio correction quantity AFCQ is prohibited only for the one cylinder. The present invention may employ a construction in which in an operating range in which the cylinder air-fuel ratio correction quantities of any two or more cylinders are outside the specified range, the learning of the cylinder air-fuel ratio correction quantities of the two or more cylinders is prohibited.

Moreover, in an operating range in which the cylinder air-fuel ratio correction quantity AFCQ of any cylinder is outside the specified range, the learning of the cylinder air-fuel ratio correction quantity AFCQ may be prohibited for a group of cylinders to which the cylinder belongs.

Seventh Embodiment

The ECU 40 performs abnormality diagnosis on the basis of the output of the air-fuel ratio sensor 37 disposed upstream of the catalyst 38 and/or the output of the oxygen sensor 41 disposed downstream of the catalyst 38, or a parameter changed by the effect of an air-fuel ratio (engine rotation variation). The ECU 40 performs various abnormality diagnoses, for example, deterioration diagnosis of the catalyst 38, abnormality diagnosis of the fuel system, abnormality diagnosis of the air system, abnormality diagnosis of response of the air-fuel ratio sensor 37, abnormality diagnosis of the oxygen sensor 41, diagnosis of state of combustion (detection of misfire), and diagnosis of fuel property.

The deterioration diagnosis of the catalyst 38 is performed on the basis of the ratio between a change in the output of the air-fuel ratio sensor 37 and a change in the output of the oxygen sensor 41. The abnormality diagnosis of the fuel system is performed on the basis of a cylinder air-fuel ratio correction quantity AFCQ and its learning value, which will be described later. The abnormality diagnosis of response of the air-fuel ratio sensor 37 is performed on the basis of a change in the output of the air-fuel ratio sensor 37. The detection of misfire is performed on the basis of a change in the engine revolution speed. The abnormality diagnosis of the oxygen sensor 41 is performed on the basis of the relationship between the behavior of the output of the oxygen sensor 41 and the behavior of the output of the air-fuel ratio sensor 37. For example, when a state in which an air-fuel ratio upstream of the catalyst 38 is continuously rich continues, an air-fuel ratio downstream of the catalyst 38 is changed to a rich ratio with a delay of time during which the quantity of adsorption of rich component of the catalyst 38 is saturated. Hence, it suffices to determine whether the oxygen sensor 41 is abnormal by whether the output of the oxygen sensor 41 is changed to a rich ratio.

While the engine is operated, the ECU 40 performs various abnormality diagnoses, for example, the deterioration diagnosis of the catalyst 38, the abnormality diagnosis of the fuel system, the abnormality diagnosis of the air system, the abnormality diagnosis of response of the air-fuel ratio sensor 37, the abnormality diagnosis of the oxygen sensor 41, the diagnosis of state of combustion (detection of misfire), and the diagnosis of fuel property. The ECU 40 performs these abnormality diagnoses by the use of the output of the air-fuel ratio sensor 37 and the output of the oxygen sensor 41, and the parameter (engine rotational variation) changed by the effect of the air-fuel ratio. Hence, when the cylinder air-fuel ratio control is abnormal, the ECU 40 might perform the abnormality diagnoses erroneously.

In this seventh embodiment, when a state in which the cylinder air-fuel ratio correction quantity AFCQ of any cylinder (or its learning value) is outside an allowable specified range continues for a while, the ECU 40 is prevented from performing the abnormality diagnoses affected by the cylinder air-fuel ratio control. With this, the ECU 40 is prevented from performing the abnormality diagnoses erroneously by the unstable cylinder air-fuel ratio control. Here, the abnormality diagnoses affected by the cylinder air-fuel ratio control include, for example, the deterioration diagnosis of the catalyst 38, the abnormality diagnosis of the fuel system, the abnormality diagnosis of the air system, the abnormality diagnosis of response of the air-fuel ratio sensor 37, the abnormality diagnosis of the oxygen sensor 41, the diagnosis of state of combustion (detection of misfire), and the diagnosis of fuel property. At least one of these abnormality diagnoses is prohibited.

The cylinder air-fuel ratio control and the prevention of erroneous diagnosis of abnormality diagnosis are performed by the ECU 40 according to the respective routines shown in FIG. 16 to FIG. 19. The processing contents of the respective routines will be described below.

[Main Routine for Cylinder Air-Fuel Ratio Control]

Figure 16:
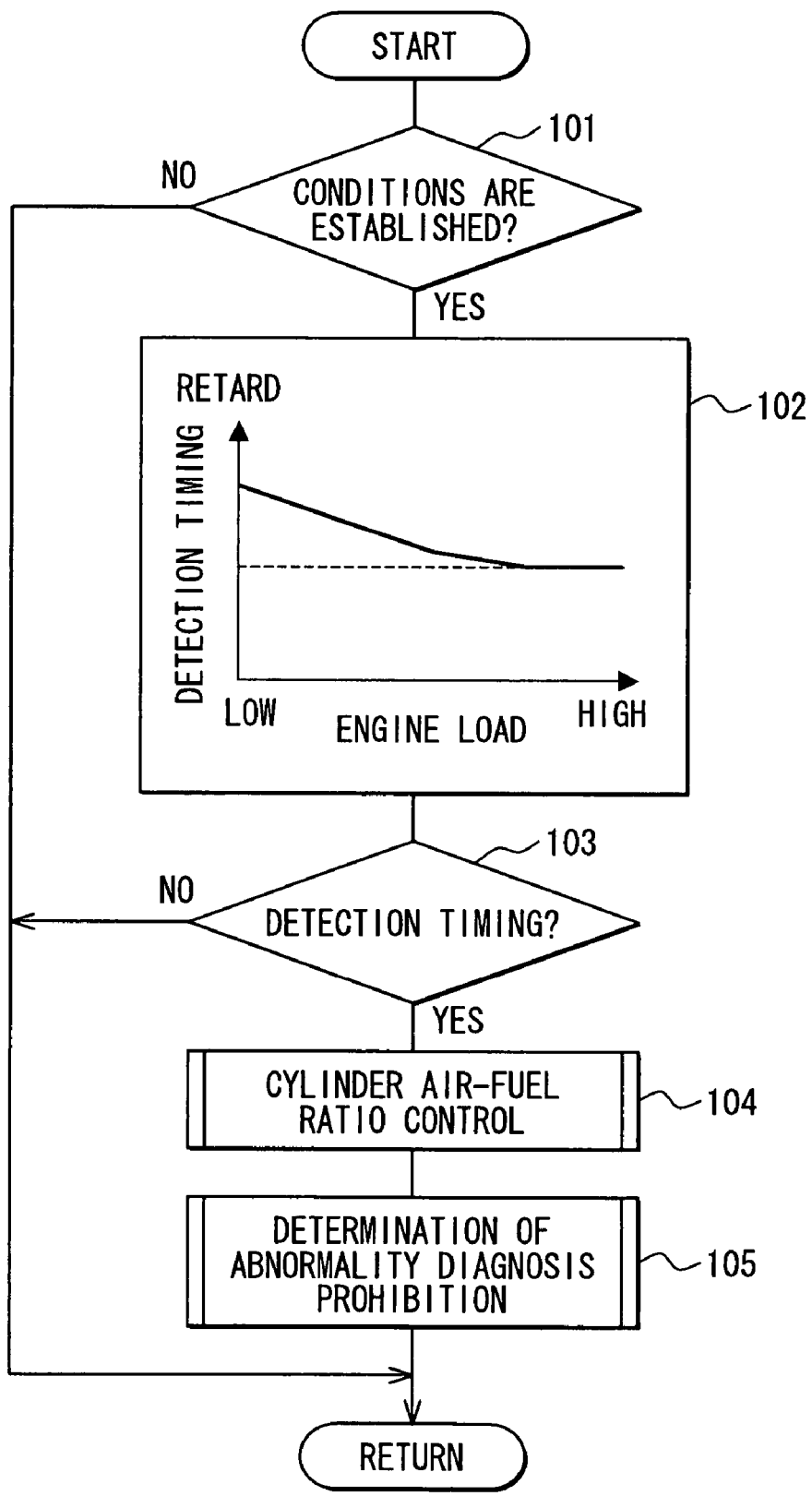
FIG. 16 is a flow chart showing the flow of processing of a main routine for cylinder air-fuel ratio control in an seventh embodiment.

A main routine for cylinder air-fuel ratio control shown in FIG. 16 is started for each specified crank angle (for example 30° CA) in synchronization with the output pulse of the crank angle sensor 33. The same processing as in steps 101 to 104 shown in FIG. 2 is performed in steps 101 to 104.

Figure 18:
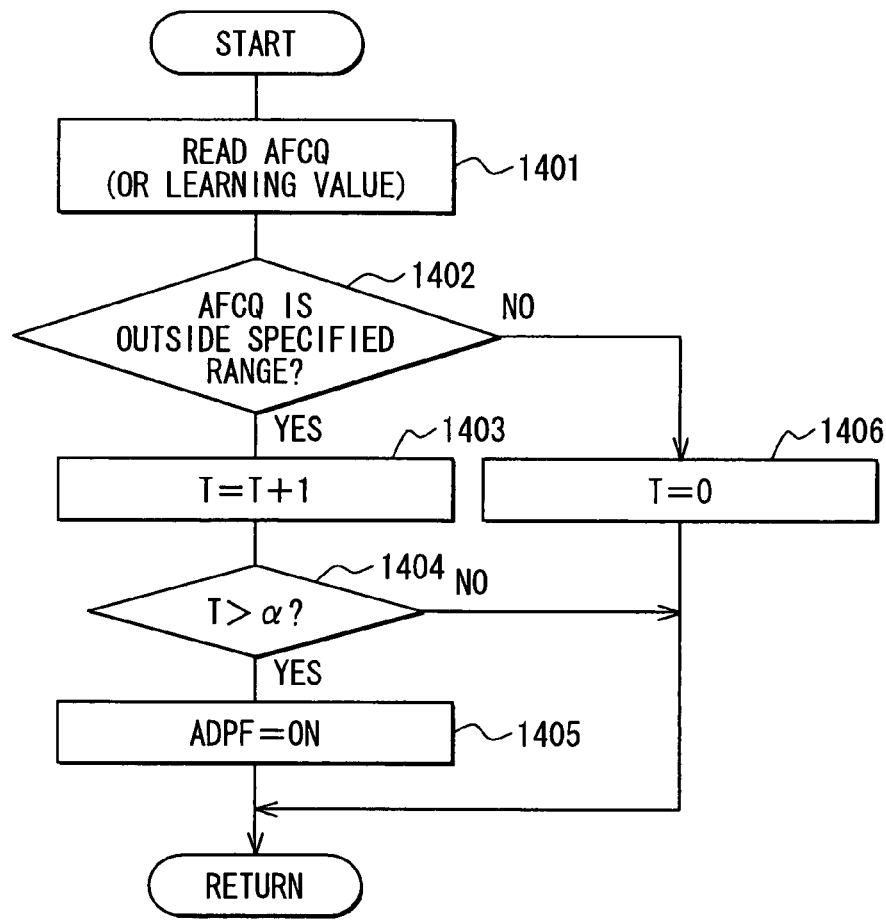
FIG. 18 is a flow chart showing the flow of processing of a routine for determining prohibition of abnormality diagnosis in the seventh embodiment.

When the present crank angle is the air-fuel ratio detection timing set in the step 102, the routine proceeds to step 104 where the routine for performing cylinder air-fuel ratio control shown in FIG. 3 is performed. Then, the routine proceeds to step 105 where a routine for determining abnormality diagnosis, which will be described later and is shown in FIG. 18, is performed. When a state in which the cylinder air-fuel ratio correction quantity AFCQ of any cylinder (or its learning value) is outside an allowable specified range continues for a while, an abnormality diagnosis prohibition flag ADPF is set ON (abnormality diagnosis is prohibited) to prohibit abnormality diagnosis affected by the cylinder air-fuel ratio control.

[Routine for Learning Cylinder Air-Fuel Ratio Correction Quantity]

Figure 17:
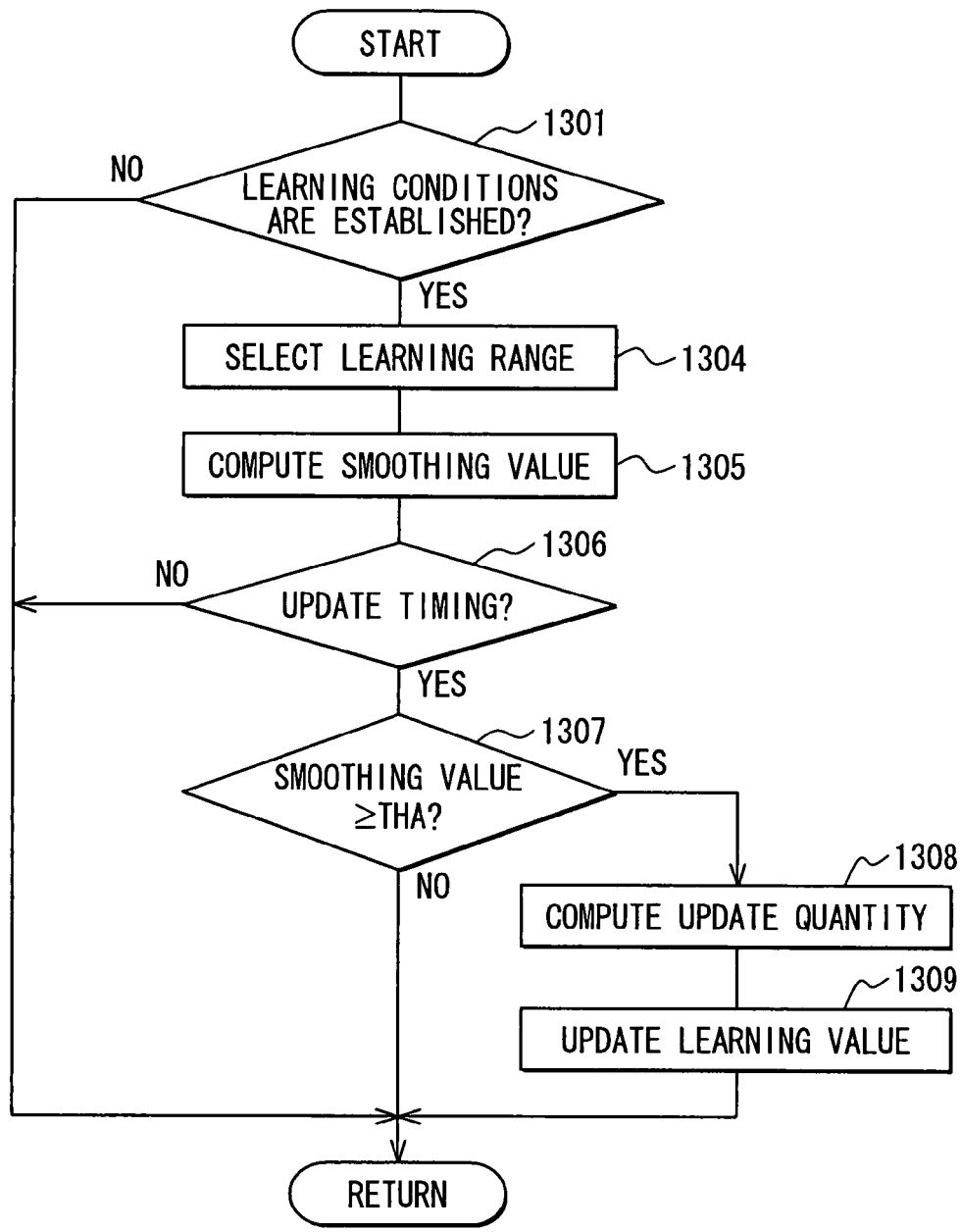
FIG. 17 is a flow chart showing the flow of processing of a routine for learning a cylinder air-fuel ratio correction quantity in the seventh embodiment.

A routine for learning cylinder air-fuel ratio correction quantity AFCQ, shown in FIG. 17, is a subroutine performed in step 205 of the routine for performing cylinder air-fuel ratio control, shown in FIG. 3. When this routine is started, first in step 1301, it is determined whether conditions for performing learning hold. Here, the conditions for performing learning include, for example, the following two conditions (1) and (2).
(1) The cylinder air-fuel ratio control is being performed.
(2) The engine is operated in a stable operating state in which a change in air-fuel ratio is a specified value or less.

When both of the foregoing two conditions (1) and (2) are satisfied, the conditions for performing learning hold. When any one of the conditions is not satisfied, the conditions for performing learning do not hold. When these conditions for performing learning do not hold, this routine is finished without performing the next and subsequent processings.

On the other hand, when the conditions for performing learning hold, the routine proceeds to step 1304 where a learning range (learning range for updating a learning value of a cylinder air-fuel ratio correction quantity AFCQ) corresponding to the present engine operating range (engine revolution speed and load) is selected in the map for learning a cylinder air-fuel ratio correction quantity AFCQ, the map being stored in the rewritable nonvolatile memory (not shown) of the ECU 40 and shown in FIG. 7. Then, the routine proceeds to step 1305 where the smoothing value of the cylinder air-fuel ratio correction quantity AFCQ is computed for each cylinder by the following equation by the use of a smoothing coefficient K.

Smoothing value of cylinder air-fuel ratio correction quantity AFCQ={last smoothing value×(K−1)+ cylinder air-fuel ratio correction quantity AFCQ of this time}/K Then, the routine proceeds to step 1306 where it is determined whether this is the timing of updating the learning value of the cylinder air-fuel ratio correction quantity AFCQ. This timing of updating the learning value is set in such a way that a period of updating a learning value is longer than at least a period of computing a cylinder air-fuel ratio correction quantity AFCQ. When it is determined in this step 1306 that this timing is not the timing of updating the learning value, this routine is finished without performing any processing.

On the other hand, when it is determined in step 1306 that this is the timing of updating a learning value, the routine proceeds to step 1307 where it is determined whether the absolute value of the smoothing value of the cylinder air-fuel ratio correction quantity AFCQ is a specified value THA or more. When the absolute value of the smoothing value of the cylinder air-fuel ratio correction quantity AFCQ is smaller than the specified value THA, it is determined that the learning value does not need to be updated and this routine is finished.

Moreover, when it is determined in step 1307 that the absolute value of the smoothing value of the cylinder air-fuel ratio correction quantity AFCQ is the specified value THA or more, the routine proceeds to step 1308 where the update quantity of a learning value is computed by a map on the basis of the smoothing value of a cylinder air-fuel ratio correction quantity AFCQ. The map used for computing the update quantity of a learning value is set in such a way that as the smoothing value of a cylinder air-fuel ratio correction quantity AFCQ becomes larger, the update quantity of a learning value becomes larger.

Then, the routine proceeds to step 1309 where a value found by adding the update quantity of a learning value of this time to the last learning value of the cylinder air-fuel ratio correction quantity AFCQ is updated and stored as a new learning value of the cylinder air-fuel ratio correction quantity AFCQ in the rewritable non-volatile memory (not shown) of the ECU 40. At this time, the learning value in a learning range selected in the step 1304 of the map for learning the cylinder air-fuel ratio correction quantity AFCQ shown in FIG. 7 is updated. The map for learning the cylinder air-fuel ratio correction quantity AFCQ shown in FIG. 7 is made for each cylinder.

[Routine for Determining Prohibition of Abnormality Diagnosis]

A routine for determining abnormality diagnosis shown in FIG. 18 is a subroutine performed in step 105 of the main routine for cylinder air-fuel ratio control shown in FIG. 16.

When this routine is started, first in step 1401, the cylinder air-fuel ratio correction quantity AFCQ of each cylinder (or its learning value) is read. Then, in the next step 1402, it is determined whether the cylinder air-fuel ratio correction quantity AFCQ (or its learning value) of any cylinder is outside a specified range. When the cylinder air-fuel ratio correction quantities of all cylinders (or their learning values) are within the specified range, abnormality diagnosis is allowed. In this case, the routine proceeds to step 1406 where the value of the delay time counter T is reset to "0", the delay time counter T counting a period of time during which a state in which the cylinder air-fuel ratio correction quantity AFCQ (or its learning value) is outside the specified range continues, and then this routine is finished.

In contrast to this, when it is determined in the step 1402 that the cylinder air-fuel ratio correction quantity AFCQ (or its learning value) of any cylinder is outside the specified range, the routine proceeds to step 1403 where the delay time counter T counts up the period of time during which a state in which the cylinder air-fuel ratio correction quantity AFCQ is outside the specified range continues. Then, the routine proceeds to step 1404 where it is determined whether the count time of the delay time counter T is larger than a specified value. When the count time of the delay time counter T is not larger than the specified value, this routine is finished without performing any processing. Then, when the count time of the delay time counter T becomes larger than the specified value, the routine proceeds to step 1405 where the abnormality diagnosis prohibition flag ADPF is set ON (abnormality diagnosis is prohibited) and then this routine is finished.

[Routine for Performing Abnormality Diagnosis]

Figure 19:
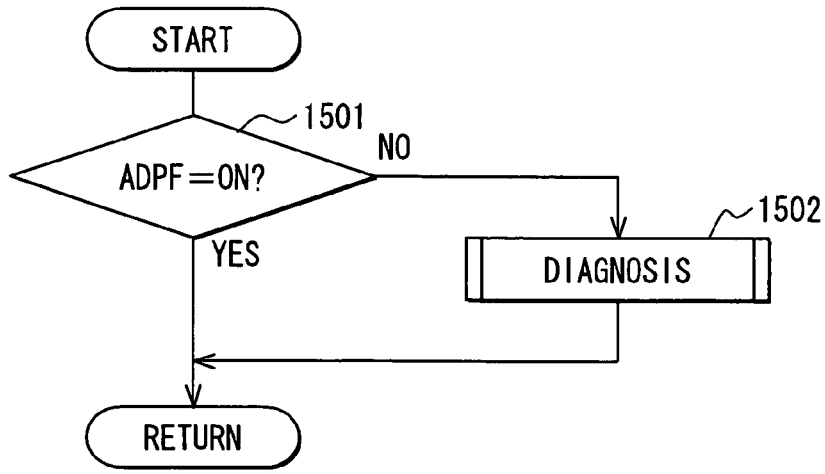
FIG. 19 is a flow chart showing the flow of processing of a routine for performing abnormality diagnosis in the seventh embodiment.

A routine for performing abnormality diagnosis shown in FIG. 19 is performed at specified intervals while the engine is operated. When this routine is started, first in step 1501, it is determined whether the abnormality diagnosis prohibition flag ADPF is set (abnormality diagnosis is prohibited). When the abnormality diagnosis prohibition flag ADPF is not set (abnormality diagnosis is not prohibited), the routine proceeds to step 1502 where a routine for performing various abnormality diagnoses (abnormality diagnosis means) is performed. When the abnormality diagnosis prohibition flag ADPF is set (abnormality diagnosis is prohibited), this routine is finished without performing the routine for performing various abnormality diagnoses.

When the abnormality diagnosis prohibition flag ADPF is set ON, it suffices to prohibit only abnormality diagnosis in which erroneous diagnosis is likely to be made by the effect of the cylinder air-fuel ratio control and it is not necessary to prohibit abnormality diagnoses other than the abnormality diagnosis. Here, the abnormality diagnosis in which erroneous diagnosis is likely to be made by the effect of the cylinder air-fuel ratio control includes, for example, diagnosis of deterioration of the catalyst 38, abnormality diagnosis of the fuel system, abnormality diagnosis of the air system, abnormality diagnosis of response of the air-fuel ratio sensor 37, abnormality diagnosis of the oxygen sensor 41, diagnosis of state of combustion (detection of misfire), and diagnosis of fuel property.

Control examples of this seventh embodiment described above will be described by the use of a time chart shown in FIG. 20 and FIG. 21.

Figure 20:
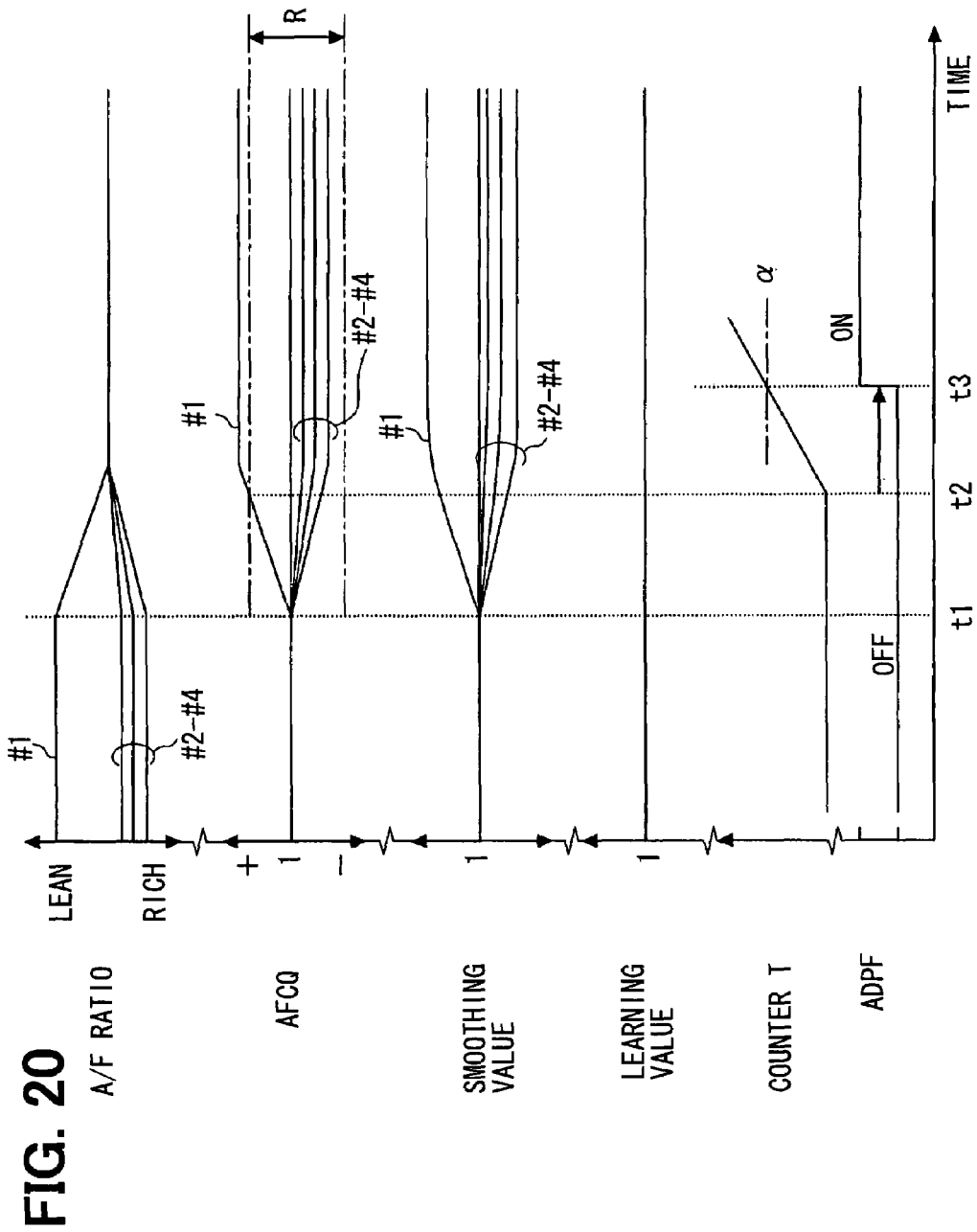
FIG. 20 is a time chart showing a control example in the seventh embodiment.

FIG. 20 is an example of comparing the cylinder air-fuel ratio correction quantity AFCQ with a specified range R (allowable range R) to turn ON/OFF the abnormality diagnosis prohibition flag ADPF. In this example, at time t1, the conditions for performing the cylinder air-fuel ratio control are satisfied and the cylinder air-fuel ratio control is started to compute the cylinder air-fuel ratio correction quantities of the respective cylinders #1 to #4. While the cylinder air-fuel ratio control is performed, it is determined whether the cylinder air-fuel ratio correction quantities of the respective cylinders #1 to #4 are outside the specified range R (allowable range R). At time t2 when the cylinder air-fuel ratio correction quantity AFCQ of any cylinder (cylinder #1 in the example shown in FIG. 20) becomes outside the specified range R, the delay time counter T starts the counting-up operation to count the period of time during which the state in which the cylinder air-fuel ratio correction quantities of the cylinders are outside the specified range continues.

Then, at time t3 when the count value of the delay time counter T becomes larger than a specified value α, the abnormality diagnosis prohibition flag ADPF is set ON (abnormality diagnosis is prohibited). Thereafter, the abnormality diagnosis affected by the cylinder air-fuel ratio control is prohibited.

Figure 21:
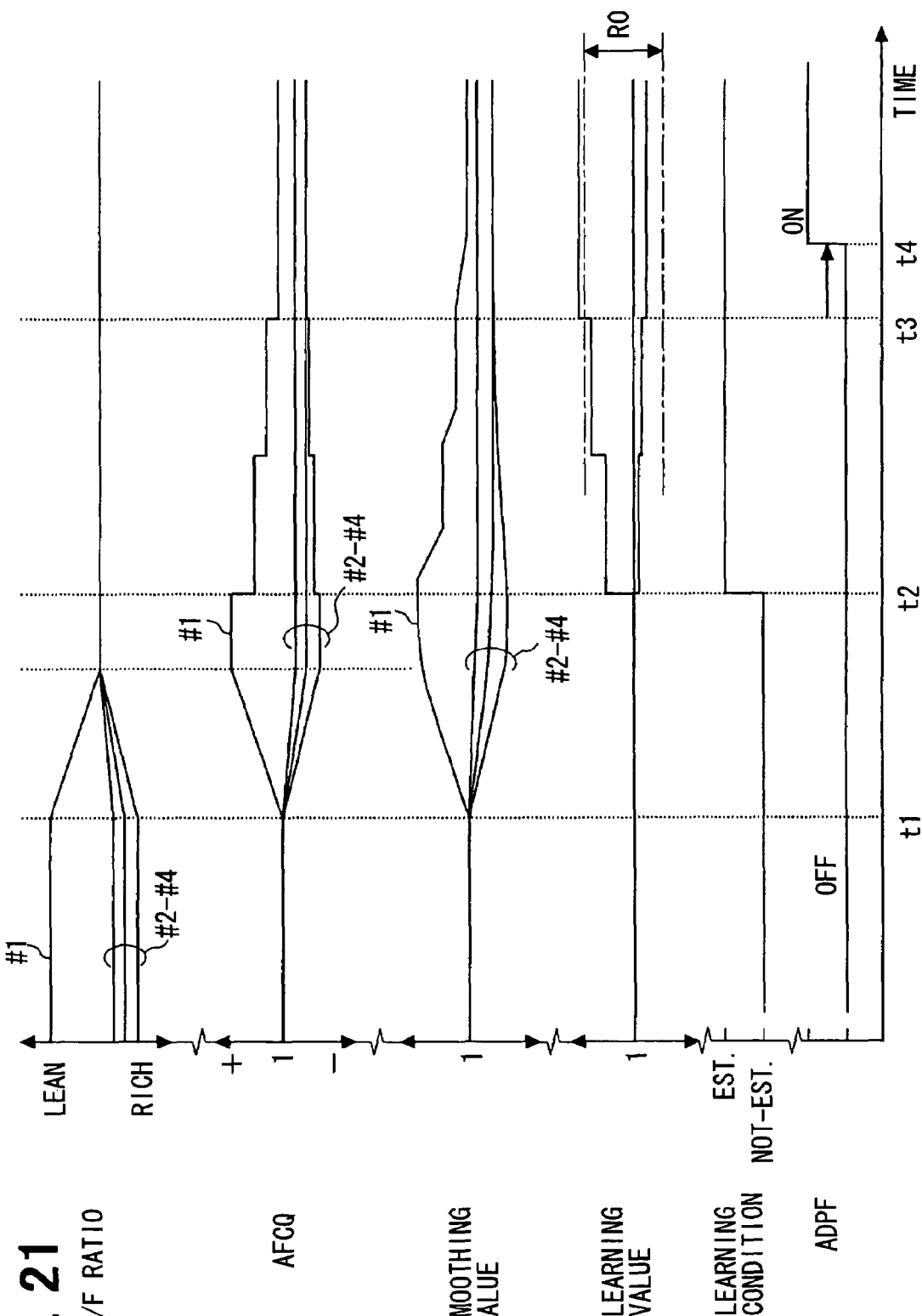
FIG. 21 is a time chart showing a control example in the seventh embodiment.

On the other hand, FIG. 21 is an example of comparing the learning value of the cylinder air-fuel ratio correction quantity AFCQ with a specified range R0 (allowable range R0) to turn ON/OFF the abnormality diagnosis prohibition flag ADPF. In this example, at time t1, the conditions for performing the cylinder air-fuel ratio control are satisfied and the cylinder air-fuel ratio control is started to compute the cylinder air-fuel ratio correction quantities of the respective cylinders #1 to #4.

Then, at time t2, the conditions for performing the cylinder air-fuel ratio control are satisfied and the learning of the cylinder air-fuel ratio correction quantity AFCQ is started to update the learning values of the cylinder air-fuel ratio correction quantities of the respective cylinders #1 to #4.

Then, it is determined whether the cylinder air-fuel ratio correction quantities of the respective cylinders #1 to #4 are outside the specified range (allowable range). At time t3 when the learning value of the cylinder air-fuel ratio correction quantity AFCQ of any cylinder becomes outside the specified range, the delay time counter T starts the counting-up operation to count the period of time during which the state in which the cylinder air-fuel ratio correction quantities are outside the specified range continues.

Then, at time t4 when the count value of the delay time counter T becomes larger than a specified value, the abnormality diagnosis prohibition flag ADPF is set ON (abnormality diagnosis is prohibited). Thereafter, the abnormality diagnosis affected by the cylinder air-fuel ratio control is prohibited.

According to this seventh embodiment described above, when the state in which the cylinder air-fuel ratio correction quantity AFCQ (or its learning value) of any cylinder is outside the specified range continues for a while, the abnormality diagnosis affected by the cylinder air-fuel ratio control is prohibited, so the erroneous diagnosis of the abnormality diagnosis caused by the unstable cylinder air-fuel ratio control can be prevented. Thus, the reliability of the abnormality diagnosis can be improved.

Here, the present invention is not limited to a construction in which when the state in which the cylinder air-fuel ratio correction quantity AFCQ of any one of the cylinders is outside the specified range continues for a while, abnormality diagnosis affected by the cylinder air-fuel ratio control is prohibited. The present invention may employ a construction in which when the state in which the cylinder air-fuel ratio correction quantities of any two or more cylinders are outside the specified range continues for a while, abnormality diagnosis affected by the cylinder air-fuel ratio control is prohibited.

Moreover, the present invention may employ a construction in which when the state in which the cylinder air-fuel ratio correction quantity AFCQ of any one of the cylinders is outside the specified range continues for a while, abnormality diagnosis is not prohibited but the diagnosis result of the abnormality diagnosis is cancelled. This construction can also produce the substantially same effect.

Eighth Embodiment

In the routine for learning the cylinder air-fuel ratio correction quantity AFCQ shown in FIG. 17, which has been described in the seventh embodiment, the learning value of the cylinder air-fuel ratio correction quantity AFCQ is updated for each engine operating range (engine revolution speed and load) (see FIG. 7).

Figure 22:
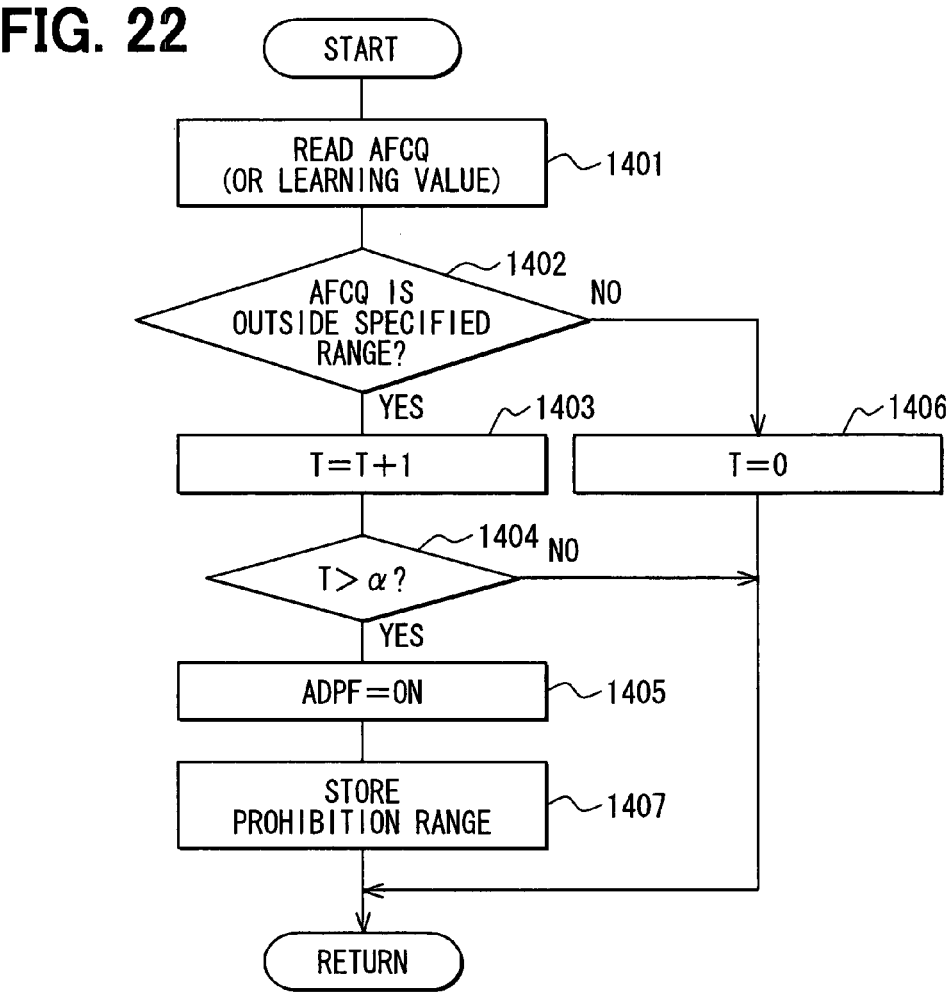
FIG. 22 is a flow chart showing the flow of processing of a routine for determining prohibition of abnormality diagnosis in an eighth embodiment.
Figure 23:
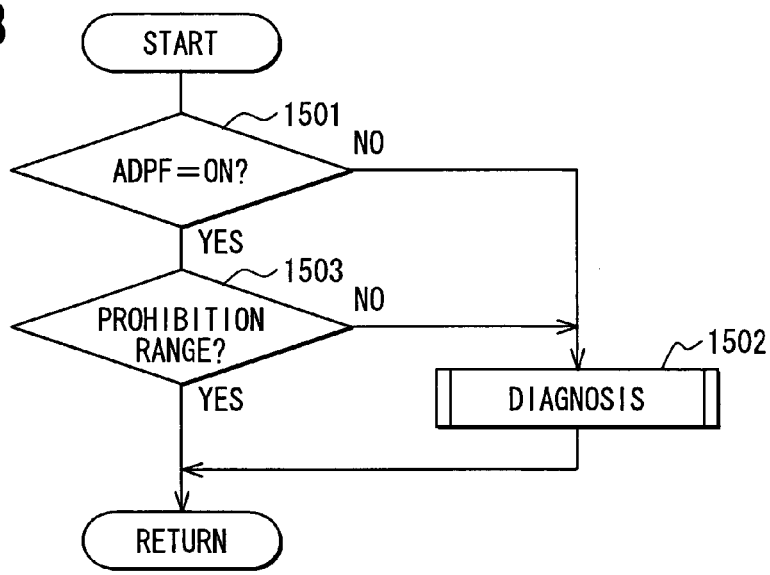
FIG. 23 is a flow chart showing the flow of processing of a routine for performing abnormality diagnosis in the eighth embodiment.

In consideration of this point, in an eighth embodiment of the present invention shown in FIG. 22 and FIG. 23, when the cylinder air-fuel ratio correction quantity AFCQ (or its learning value) of any cylinder is outside the specified range, the abnormality diagnosis affected by the cylinder air-fuel ratio control is prohibited only in an operating range in which the cylinder air-fuel ratio correction quantity AFCQ (or its learning value) is outside the specified range. In an operating range other than the operating range, the abnormality diagnosis affected by the cylinder air-fuel ratio control is allowed.

Processing contents of routines shown in FIG. 22 and FIG. 23 performed in this eighth embodiment will be described. A routine for determining prohibition of abnormality diagnosis shown in FIG. 22 is different from the routine for determining prohibition of abnormality diagnosis, which has been described in the seventh embodiment and is shown in FIG. 18, only in that processing in step 1407 is appended to the step 1405 of the routine shown in FIG. 18, and is the same in the processing of the other steps as the routine shown in FIG. 18.

In the routine for determining prohibition of abnormality diagnosis shown in FIG. 22, when a state in which the cylinder air-fuel ratio correction quantity AFCQ of any cylinder is outside the specified range continues for a specified time, the abnormality diagnosis prohibition flag ADPF is set ON (abnormality diagnosis is prohibited). Then, the routine proceeds to step 1407 where the present engine operating range is stored as an abnormality diagnosis prohibition range in the rewritable non-volatile memory (not shown) of the ECU 40. Then, this routine is finished.

A routine for performing prohibition of abnormality diagnosis shown in FIG. 23 is different from the routine for performing prohibition of abnormality diagnosis, which has been described in the seventh embodiment and is shown in FIG. 19, only in that processing in step 1503 is appended to step 1501 of the routine shown in FIG. 19, and is the same in the processing of the other steps as the routine shown in FIG. 19.

When this routine is started, first in step 1501, it is determined whether the abnormality diagnosis prohibition flag ADPF is set (abnormality diagnosis is prohibited). When the abnormality diagnosis prohibition flag ADPF is not set (abnormality diagnosis is not prohibited), the routine proceeds to step 1502 where a routine for performing various abnormality diagnoses is performed. When the abnormality diagnosis prohibition flag ADPF is set (abnormality diagnosis is prohibited), the routine proceeds to step 1503 where it is determined whether the present operating range is the abnormality diagnosis prohibition range stored in the non-volatile memory (not shown) of the ECU 40.

As a result, when it is determined that the present operating range is not the abnormality diagnosis prohibition range stored in the non-volatile memory (not shown) of the ECU 40, the routine proceeds to step 1502 where the routine for performing various abnormality diagnoses is performed. In contrast to this, when it is determined that the present operating range is the abnormality diagnosis prohibition range, this routine is finished without performing the routine for performing various abnormality diagnoses. With this, the abnormality diagnosis affected by the cylinder air-fuel ratio control is prohibited only in the abnormality diagnosis prohibition range. Alternatively, the diagnosis result of the abnormality diagnosis may be cancelled.

In this eighth embodiment described above, the abnormality diagnosis affected by the cylinder air-fuel ratio control is prohibited only in the operating range in which the cylinder air-fuel ratio correction quantity AFCQ (or its learning value) of any cylinder is outside the specified range. Thus, the erroneous diagnosis of the abnormality diagnosis is prevented by prohibiting (or canceling) the abnormality diagnosis only in the operating range in which the cylinder air-fuel ratio correction quantity AFCQ (or its learning value) is outside the specified range, whereas the abnormality diagnosis can be continuously made in the other operating range in which the cylinder air-fuel ratio correction quantity AFCQ (or its learning value) is within the specified range. Thus, when an abnormality occurs, the abnormality can be found quickly.

Here, the present invention is not limited to a construction in which the abnormality diagnosis is prohibited only in an operating range in which the cylinder air-fuel ratio correction quantity AFCQ (or its learning value) of any one of the cylinders is outside the specified range. The present invention may employ a construction in which the abnormality diagnosis is prohibited only in an operating range in which the cylinder air-fuel ratio correction quantities (or their learning values) of any two or more cylinders are outside the specified range.

Ninth Embodiment

Figure 24:
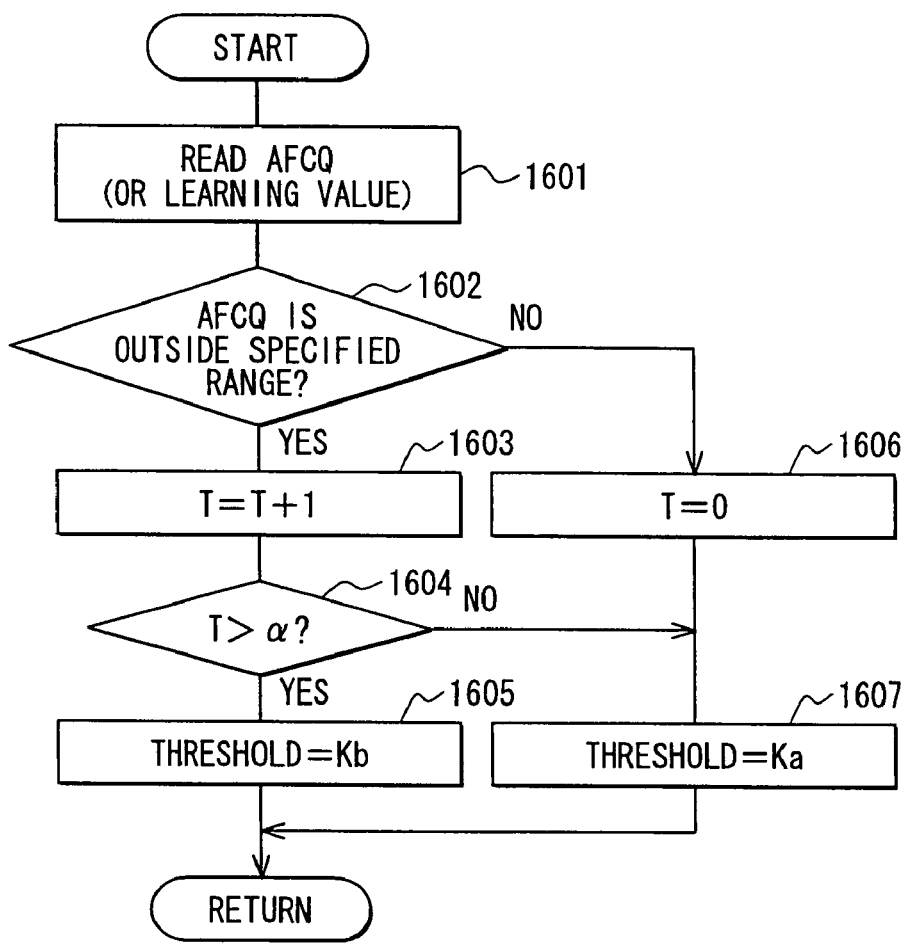
FIG. 24 is a flow chart showing the flow of processing of a routine for changing a determination condition in a ninth embodiment.

In an ninth embodiment of the present invention shown in FIG. 24, the cylinder air-fuel ratio correction quantity AFCQ (or its learning value) of any cylinder is compared with a specified range and the determination condition (determination threshold) for the abnormality diagnosis is changed on the basis of the comparison result.

A routine for changing a determination condition, shown in FIG. 24, is performed at specified intervals while the engine is operated. When this routine is started, first in step 1601, the cylinder air-fuel ratio correction quantity AFCQ (or its learning value) of each cylinder is read. In the next step 1602, it is determined whether the cylinder air-fuel ratio correction quantity AFCQ (or its learning value) of any cylinder is outside a specified range. As a result, when the cylinder air-fuel ratio correction quantities (or their learning values) of all cylinders are within the specified range, the routine proceeds to step 1606 where the value of the delay time counter T is reset to "0", the delay time counter T counting a period of time during which a state in which the cylinder air-fuel ratio correction quantity AFCQ is outside the specified range continues. Then, in the next step 1607, a determination threshold of the abnormality diagnosis is set to a normal determination threshold Ka and then this routine is finished.

In contrast to this, when it is determined in the step 1602 that the cylinder air-fuel ratio correction quantity AFCQ (or its learning value) of any cylinder is outside the specified range, the routine proceeds to step 1603 where the delay time counter T counts up a period of time during which a state in which the cylinder air-fuel ratio correction quantity AFCQ is outside the specified range continues. Then, the routine proceeds to step 1604 where the count value of the delay time counter T is larger than a specified value. When the count value of the delay time counter T is not larger than the specified value, this routine is finished without performing any processing. Thereafter, when the count value of the delay time counter T becomes larger than the specified value, the routine proceeds to step 1605 where the determination threshold of the abnormality diagnosis is set to a determination threshold Kb at which abnormality is less found and then this routine is finished.

In this ninth embodiment described above, the cylinder air-fuel ratio correction quantity AFCQ (or its learning value) of any cylinder is compared with the specified range and the determination threshold of the abnormality diagnosis is changed on the basis of the comparison result. Hence, when the cylinder air-fuel ratio correction quantity AFCQ (or its learning value) of any one or two or more cylinders is outside the specified range, the determination threshold of the abnormality diagnosis can be changed to a determination threshold at which abnormality is less found. Therefore, the erroneous diagnosis of the abnormality diagnosis affected by the cylinder air-fuel ratio control can be prevented.

In this case, in an operating range different from the operating range in which the cylinder air-fuel ratio correction quantity AFCQ (or its learning value) of any one or two or more cylinders is outside the specified range, the determination threshold of the abnormality diagnosis may be set to the same determination threshold as in the operating range in which the cylinder air-fuel ratio correction quantity AFCQ is within the specified range. With this, only in an operating range in which the cylinder air-fuel ratio correction quantity AFCQ (or its learning value) is outside the specified range, the determination threshold of the abnormality diagnosis is changed to a severe determination threshold at which abnormality is less found to prevent the erroneous diagnosis of the abnormality diagnosis, whereas in the other operating range in which the cylinder air-fuel ratio correction quantity AFCQ (or its learning value) is within the specified range, the same abnormality diagnosis as in a normal operation can be continuously made. Therefore, when an abnormality occurs, the abnormality can be found quickly.

In the present invention, the determination threshold of the abnormality diagnosis is changed. However, a diagnosis parameter to be compared with this determination threshold may be changed (corrected). The determination condition for the abnormality diagnosis may be changed.

Tenth Embodiment

In gas recirculation control (exhaust gas recirculation (EGR), positive crankcase ventilation (PCV), and evaporated gas purge control (PGR)) that has an effect on an air-fuel ratio by gas distribution among the cylinders, there is a possibility that the degree of the effect on the air-fuel ratio of each cylinder will be different for each cylinder, which results in increasing variations in the air-fuel ratio between the cylinders. Hence, when the cylinder air-fuel ratio correction quantity AFCQ or its learning value is outside the specified range (allowable range), if the gas recirculation control is performed in the same way as in the normal operation, there is a possibility that the cylinder air-fuel ratio correction quantity AFCQ or its learning value will become a further abnormal value, whereby the state of the cylinder air-fuel control will further deteriorate.

Figure 25:
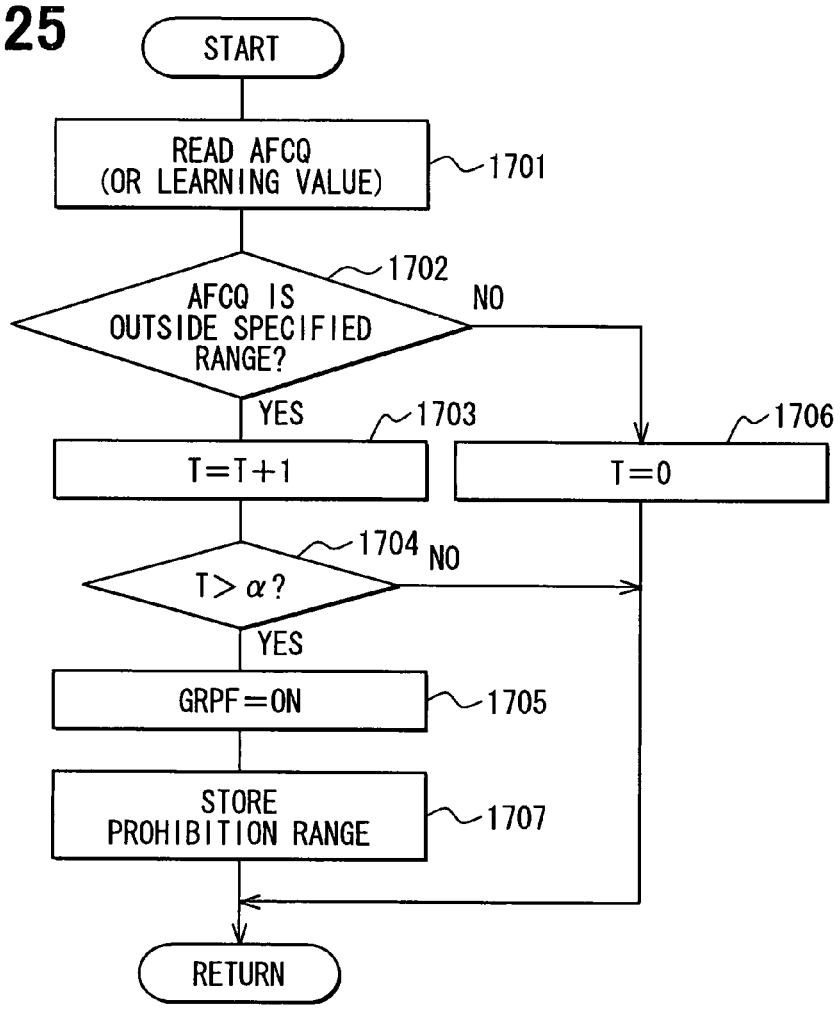
FIG. 25 is a flow chart showing the flow of processing of a routine for determining prohibition of gas recirculation control in an tenth embodiment.
Figure 26:
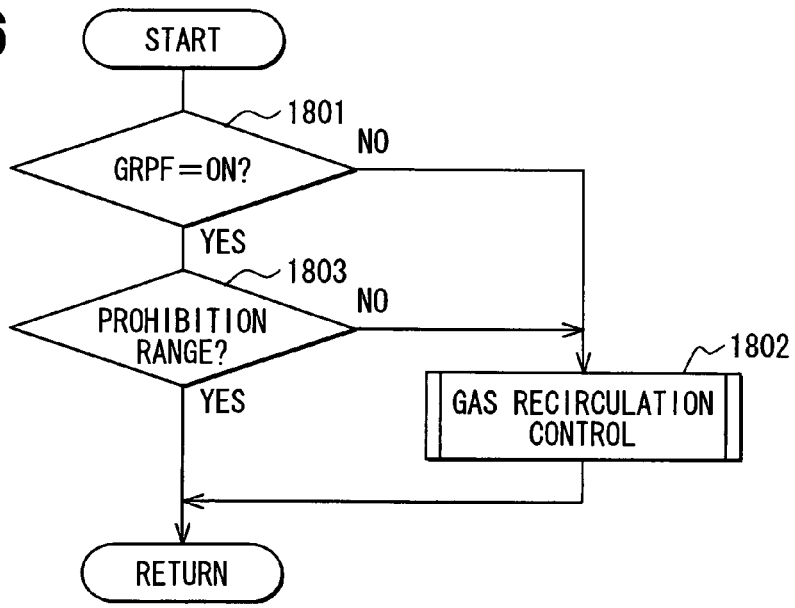
FIG. 26 is a flow chart showing the flow of processing of a routine for performing gas recirculation control in the tenth embodiment.

In view of the circumstances, in an tenth embodiment of the present invention shown in FIG. 25 and FIG. 26, when gas recirculation control (exhaust gas recirculation (EGR), positive crankcase ventilation (PCV), and evaporated gas purge control (PGR)) that has an effect on an air-fuel ratio by gas distribution among the cylinders is performed, if the cylinder air-fuel ratio correction quantity AFCQ (or its learning value) of any cylinder is outside the specified range, the gas recirculation control is prohibited.

A routine for determining prohibition of gas recirculation control shown in FIG. 25 is performed at specified intervals while the engine is operated. When this routine is started, first in step 1701, the cylinder air-fuel ratio correction quantity AFCQ (or its learning value) of each cylinder is read. In the next step 1702, it is determined whether the cylinder air-fuel ratio correction quantity AFCQ (or its learning value) of any cylinder is outside the specified range. When the cylinder air-fuel ratio correction quantities (or their learning values) of all cylinders are within the specified range, the gas recirculation control is allowed. In this case, the routine proceeds to step 1706 where the count value of the delay time counter T is reset to "0", the delay time counter T counting a period of time during which a state continues in which the cylinder air-fuel ratio correction quantity AFCQ (or its learning value) is the specified range, and then this routine is finished.

[B0085]

On the other hand, when it is determined in the step 1702 that the cylinder air-fuel ratio correction quantity AFCQ (or its learning value) of any cylinder is outside the specified range, the routine proceeds to step 1703 where the delay time counter T counts up a period of time during which a state in which the cylinder air-fuel ratio correction quantity AFCQ (or its learning value) is outside the specified value continues. Then, the routine proceeds to step 1704 where it is determined whether the count time of the delay time counter T is larger than a specified time. When the count time of the delay time counter T is not larger than the specified time, this routine is finished without performing any processing.

Thereafter, when the count time of the delay time counter T becomes larger than the specified time, the routine proceeds to step 1705 where a gas recirculation prohibition control flag GRPF is set ON (gas recirculation control is prohibited). Then, the routine proceeds to step 1707 where the present engine operating range is stored as a gas recirculation control prohibition operating range in the rewritable memory (not shown) of the ECU 40 and then this routine is finished.

A routine for performing gas recirculation control shown in FIG. 26 is performed at specified intervals while the engine is operated. When this routine is started, first in step 1801, it is determined whether the gas recirculation prohibition control flag GRPF is set ON (gas recirculation control is prohibited). When the gas recirculation prohibition control flag GRPF is not set ON (gas recirculation control is not prohibited), the routine proceeds to step 1802 where the routine for performing gas recirculation control is performed to perform at least one of the exhaust recirculation control (EGR), the positive crankcase ventilation control (PCV), and the evaporated gas recirculation control (PGR).

On the other hand, when the gas recirculation prohibition control flag GRPF is set ON (gas recirculation control is prohibited), the routine proceeds to step 1803 where it is determined whether the present engine operating range is the gas circulation control prohibition operating range stored in the non-volatile memory (not shown) of the ECU 40.

As a result, when the present engine operating range is not the gas circulation control prohibition operating range stored in the non-volatile memory (not shown) of the ECU 40, the routine proceeds to step 1802 where the routine for performing gas recirculation control is performed. In contrast to this, when the present engine operating range is the gas circulation control prohibition operating range, this routine is finished without performing the routine for performing gas recirculation control. With this, the gas circulation control for impairing the state of the cylinder air-fuel ratio control is prohibited only in the gas circulation control prohibition operating range. Alternatively, the control rate of the gas recirculation control may be decreased.

According to this tenth embodiment described above, when the cylinder air-fuel ratio correction quantity AFCQ (or its learning value) of any cylinder is outside the specified range, the gas recirculation control is prohibited (or the control rate is decreased). Thus, the deterioration of the state of control of the cylinder air-fuel ratio control can be prevented and the erroneous diagnosis of the abnormality diagnosis affected by the cylinder air-fuel ratio control can be prevented.

In addition, in this tenth embodiment, the gas recirculation control is prohibited (or the control rate is decreased) only in the operating range in which the cylinder air-fuel ratio correction quantity AFCQ (or its learning value) of any cylinder is outside the specified range. Thus, even when the cylinder air-fuel ratio correction quantity AFCQ (or its learning value) of any cylinder is outside the specified range, depending on an operating range, the gas recirculation control can be performed in the same way as in the normal operation, and hence the frequency with which the gas recirculation control is performed can be secured.

Here, the present invention is not limited to a construction in which the gas recirculation control is prohibited (or the control rate is decreased) only in an operating range in which the cylinder air-fuel ratio correction quantity AFCQ (or its learning value) of any one of the cylinders is outside the specified range. The present invention may employ a construction in which the gas recirculation control is prohibited (or the control rate is decreased) only in an operating range in which the cylinder air-fuel ratio correction quantities (or its learning values) of any two or more cylinders are outside the specified range.

Alternatively, the present invention may employ a construction in which processing in step 1707 shown in FIG. 25 and processing in step 1803 shown in FIG. 26 are omitted, that is, the gas recirculation control is prohibited (or the control rate is decreased) in all operating ranges when the gas recirculation control prohibition flag is set ON (gas recirculation control is prohibited).

Moreover, the present invention is not limited to a construction in which when a state in which the cylinder air-fuel ratio correction quantity AFCQ (or its learning value) of any one cylinder is outside the specified range continues for a while, the gas recirculation control is prohibited (or the control rate is decreased). The present invention may employ a construction in which when a state in which the cylinder air-fuel ratio correction quantities (or their learning values) of any two or more cylinders are outside the specified range continues for a while, the gas recirculation control is prohibited (or the control rate is decreased).

In addition, the present invention is not limited to an intake port injection engine, but can be variously modified for implementation without departing from the spirit and scope of the present invention: for example, the present invention can be applied to a direct injection engine.

What is claimed is:

1. A cylinder air-fuel ratio controller for an internal combustion engine comprising:
    an estimation means for estimating an air-fuel ratio of each cylinder based on a detection value of an air-fuel ratio sensor disposed in an exhaust confluent portion into which an exhaust gas from a plurality of cylinder of the internal combustion engine flows, the air-fuel ratio sensor detecting an air-fuel ratio of the exhaust gas;
    a computation means for computing a cylinder air-fuel ratio correction quantity of each cylinder for correcting a variation in an air-fuel ratio between the plurality of cylinders for each cylinder;
    a control means for performing cylinder air-fuel ratio control for correcting a fuel injection quantity of each cylinder on the basis of the cylinder air-fuel ratio correction quantity to reduce the variation in the air-fuel ratio between the cylinders;
    an abnormality diagnosis means for performing abnormality diagnosis on the basis of an output of the air-fuel sensor and/or an output of an other exhaust gas sensor, or a parameter affected by an air-fuel ratio; and
    a diagnosis prohibition means for prohibiting at least one of abnormality diagnosis performed by the abnormality diagnosis means or for canceling its diagnosis result when the cylinder air-fuel ratio correction quantity of any cylinder or its learning value is outside a specified range.

2. A cylinder air-fuel ratio controller for an internal combustion engine according to claim 1, wherein
    the diagnosis prohibition means prohibits at least one of the abnormality diagnosis performed by the abnormality diagnosis means or cancels its diagnosis result only in an operating range in which the cylinder air-fuel ratio correction quantity of any cylinder or its learning value is outside the specified range.

3. A cylinder air-fuel ratio controller for an internal combustion engine comprising:
    an estimation means for estimating an air-fuel ratio of each cylinder based on a detection value of an air-fuel ratio sensor disposed in an exhaust confluent portion into which an exhaust gas from a plurality of cylinder of the internal combustion engine flows, the air-fuel ratio sensor detecting an air-fuel ratio of the exhaust gas;
    a computation means for computing a cylinder air-fuel ratio correction quantity of each cylinder for correcting a variation in the air-fuel ratio between the plurality of cylinders for each cylinder;
    a control means for performing cylinder air-fuel ratio control for correcting a fuel injection quantity of each cylinder on the basis of the cylinder air-fuel ratio correction quantity to reduce the variation in the air-fuel ratio between the cylinders;
    an abnormality diagnosis means for performing abnormality diagnosis on the basis of an output of the air-fuel sensor and/or an output of an other exhaust gas sensor, or a parameter affected by an air-fuel ratio; and
    a condition determination means for comparing the cylinder air-fuel ratio correction quantity of any cylinder or its learning value with a specified range and for determining on the basis of comparison result whether the abnormality diagnosis means can perform abnormal diagnosis.

4. A cylinder air-fuel ratio controller for an internal combustion engine according to claim 3, wherein
    the condition determination means allows the abnormality diagnosis means to perform abnormal diagnosis in an operating range different from an operating range in which the cylinder air-fuel ratio correction quantity of any cylinder or its learning value is outside the specified range.

5. A cylinder air-fuel ratio controller for an internal combustion engine comprising:
    an estimation means for estimating an air-fuel ratio of each cylinder based on a detection value of an air-fuel ratio sensor disposed in an exhaust confluent portion into which an exhaust gas from a plurality of cylinder of the internal combustion engine flows, the air-fuel ratio sensor detecting an air-fuel ratio of the exhaust gas;
    a computation means for computing a cylinder air-fuel ratio correction quantity of each cylinder for correcting a variation in the air-fuel ratio between the plurality of cylinders for each cylinder;
    a control means for performing cylinder air-fuel ratio control for correcting a fuel injection quantity of each cylinder on the basis of the cylinder air-fuel ratio correction quantity to reduce the variation in the air-fuel ratio between the cylinders;
    an abnormality diagnosis means for performing abnormality diagnosis on the basis of an output of the air-fuel sensor and/or an output of an other exhaust gas sensor, or a parameter affected by an air-fuel ratio; and
    a determination condition change means for comparing the cylinder air-fuel ratio correction quantity of any cylinder or its learning value with a specified range and for changing a determination condition for the abnormality diagnosis, which is performed by the abnormality diagnosis means, on the basis of comparison result.

6. cylinder air-fuel ratio controller for an internal combustion engine according to claim 5, wherein
    in an operating range different from an operating range in which the cylinder air-fuel ratio correction quantity of any cylinder or its learning value is outside the specified range, the determination condition change means makes a determination condition for the abnormality diagnosis performed by the abnormality diagnosis means a same determination condition as in an operating range in which the cylinder air-fuel ratio correction quantity is within the specified range.

7. A cylinder air-fuel ratio controller for an internal combustion engine according to claim 1, wherein
    the abnormality diagnosis means performs at least one of diagnoses including a deterioration diagnosis of the catalyst, an abnormality diagnosis of a fuel system, an abnormality diagnosis of an air system, an abnormality diagnosis of the air-fuel ratio sensor, an abnormality diagnosis of the exhaust gas sensor, a diagnosis of state of combustion, and a diagnosis of a fuel property.

* * * * *